(12) United States Patent
Mhetar et al.

(10) Patent No.: US 12,410,923 B2
(45) Date of Patent: Sep. 9, 2025

(54) DEHUMIDIFICATION SYSTEM

(71) Applicant: Kraton Polymers LLC, Houston, TX (US)

(72) Inventors: Vijay Mhetar, Houston, TX (US); Roger Tocchetto, Houston, TX (US)

(73) Assignee: Notark Corporation, The Woodlands, TX (US)

( * ) Notice: Subject to any disclaimer, the term of this patent is extended or adjusted under 35 U.S.C. 154(b) by 213 days.

(21) Appl. No.: 17/995,746

(22) PCT Filed: Apr. 27, 2021

(86) PCT No.: PCT/US2021/070456
§ 371 (c)(1),
(2) Date: Oct. 7, 2022

(87) PCT Pub. No.: WO2021/222925
PCT Pub. Date: Nov. 4, 2021

(65) Prior Publication Data
US 2023/0175712 A1 Jun. 8, 2023

Related U.S. Application Data

(60) Provisional application No. 63/015,924, filed on Apr. 27, 2020, provisional application No. 62/704,864, (Continued)

(51) Int. Cl.
*F24F 3/14* (2006.01)
*B01D 53/22* (2006.01)
(Continued)

(52) U.S. Cl.
CPC .............. *F24F 3/14* (2013.01); *B01D 53/229* (2013.01); *B01D 53/265* (2013.01);
(Continued)

(58) Field of Classification Search
CPC .... F24F 3/14; F24F 5/0035; F24F 2003/1435; F24F 2003/144
See application file for complete search history.

(56) References Cited

U.S. PATENT DOCUMENTS 6,485,545 B1 11/2002 Ohlrogge
2002/0096312 A1 7/2002 Korin
(Continued)

FOREIGN PATENT DOCUMENTS

CN 201461558 U 5/2010
CN 102678639 A 9/2012
(Continued)

*Primary Examiner* — Elizabeth J Martin

(57) ABSTRACT

A dehumidification system for removing water vapors from an air is disclosed. The system includes a dehumidification core defining an air channel and at least one vapor channel separated from the air channel by a membrane to facilitate a removal of moisture from the air flowing through the air channel and is selectively permeable to water and water vapor and impermeable to air. The dehumidification system further includes a water ejector having a throat portion fluidly coupled to the vapor channels and adapted to create a relatively lower pressure of water vapor within the vapor channels than in the air channel The water ejector also includes an outlet portion disposed downstream of the throat portion and configured to increase the pressure of water to facilitate a condensation of the water vapors received from the vapor channels.

18 Claims, 15 Drawing Sheets

Related U.S. Application Data filed on May 31, 2020, provisional application No. 63/129,206, filed on Dec. 22, 2020.

(51) Int. Cl.
 *B01D 53/26* (2006.01)
 *F24F 5/00* (2006.01)

(52) U.S. Cl.
 CPC .......... *B01D 53/268* (2013.01); *F24F 5/0035* (2013.01); *F24F 2003/1435* (2013.01); *F24F 2003/144* (2013.01)

(56) References Cited

U.S. PATENT DOCUMENTS

| | | | |
|---|---|---|---|
| 2011/0259039 A1* | 10/2011 | Ma | F25B 15/02 62/495 |
| 2012/0117987 A1* | 5/2012 | Claridge | B01D 53/268 62/271 |
| 2012/0118146 A1 | 5/2012 | Claridge | |
| 2014/0014289 A1 | 1/2014 | Tan | |

FOREIGN PATENT DOCUMENTS

| | | |
|---|---|---|
| CN | 105674452 A | 6/2016 |
| DE | 10002692 A1 | 8/2001 |
| EP | 2353699 A1 | 8/2011 |
| EP | 3421374 A1 | 1/2019 |
| FR | 2672968 A1 | 8/1992 |
| KR | 20190014358 A | 2/2019 |

\* cited by examiner

DEHUMIDIFICATION SYSTEM

CROSS-REFERENCE TO RELATED APPLICATIONS

This application is a 371 of international application no. PCT/US2021/070456 filed on Apr. 27, 2021, which claims priority to and the benefit of U.S. Provisional Patent Application Nos. 63/015,924, filed on Apr. 27, 2020; 62/704,864 filed on May 31, 2020, and 63/129,206 filed on Dec. 22, 2020, the contents of which are hereby incorporated by reference herein for all purposes.

TECHNICAL FIELD

The disclosure relates to a dehumidification system having a dehumidification core to remove moisture from air.

BACKGROUND

With changing climate, global warming, and urbanization there is an increase in demand of air-cooling systems for cooling homes and buildings. An air-cooling system, generally, include a refrigerant or a desiccant dehumidifier for removing heat and humidity from the air. Traditional air-conditioners requires high energy and refrigerant for removing heat can be harmful to the environment. Refrigerant based air conditioners and dehumidifiers manage sensible and latent loads in a combined step, as moisture is extracted through vapor condensation around heat exchangers during the refrigerant evaporation stage. This process is energy intensive and inefficient.

Air coolers, such as, desert coolers, or cooling towers are also used for providing relatively cool air to the interior of an occupied space. These systems generally work on water evaporation principle and cool the air by evaporating water from a surface. However, these systems do not necessarily work well in the humid environment.

U.S. Pat. No. 8,496,732 discloses an air-cooling system for dehumidifying air by establishing a humidity gradient across a water selective permeable membrane in a dehumidification unit. The humidity gradient is established by creating a vacuum on one side of the membrane using a vacuum pump creating a vacuum by compressing air. Due to the compressible nature of the air, creating vacuum by compressing air is not efficient and consumes more energy. Additionally, vacuum pumps creating vacuum by compressing air generally use a large fraction of non-condensable fluid, such as, dry air, for operation, and do not respond well in environments containing high condensable load, such as, water vapor or moisture. The air-cooling system includes a condenser to condense water vapors extracted from the air.

Hence, there is still a need for improved air-cooling systems to facilitate removal of heat and humidity from the air, which is energy efficient and avoids the use of refrigerants.

SUMMARY

In a first aspect, a dehumidification system for removing water vapors from an air is disclosed. The dehumidification system includes at least one dehumidification core defining an air channel and at least one vapor channel separated from the air channel. The dehumidification core further includes a membrane separating the at least one vapor channel from the air channel. The membrane is adapted to facilitate a removal of moisture from the air flowing through the air channel. Moreover, the membrane is selectively permeable to water and water vapor and impermeable to air. Also, the membrane includes an ion exchange capacity of at least 1.0 milliequivalents per gram. The dehumidification system further includes a liquid ejector having throat portion and an outlet portion disposed downstream of the throat portion. The throat portion is fluidly coupled to the at least one vapor channel and is adapted to create a relatively lower pressure within the at least one vapor channel than in the air channel. The outlet portion is configured to increase the pressure inside the liquid ejector to facilitate a condensation of the water vapors received from the at least one vapor channel. The dehumidification system further includes a reservoir for storing a liquid and configured to receive the liquid from the liquid ejector, and a pump fluidly connected to the liquid ejector and the reservoir. The pump is configured to supply the liquid from the reservoir to the liquid ejector.

In a second aspect, the reservoir includes a drain valve for facilitating a drainage the liquid from the reservoir when a level of the liquid reaches above a first threshold level.

In some aspects, the reservoir is made of a thermally conductive material to facilitate a heat transfer from the liquid stored inside the reservoir to an ambient.

In some embodiments, the dehumidification system further includes a heat exchanger fluidly connected to the liquid ejector and configured to receive at least a portion of the liquid exiting the liquid ejector. The heat exchanger is configured to cool the received liquid.

In one embodiment, the heat exchanger is disposed upstream of the reservoir and supply the cooled liquid to the reservoir.

According to an embodiment, the heat exchanger is an air to liquid heat exchanger.

According to an embodiment, the membrane includes sulfonated block copolymers.

In one embodiment, the liquid ejector is a water ejector adapted to receive liquid water from the pump.

In one embodiment, the dehumidification system further includes a booster pump arranged between the dehumidification core and the liquid ejector to reduce the pressure inside the vapor channels to a pressure below a partial vapor pressure of water.

In one embodiment, the booster pump facilitates in reducing the pressure to a value less than equal to 31.7 mbarA at 25 degree Celsius.

In one embodiment, the booster pump facilitates in reducing the pressure to a value less than 150 mbarA.

In one embodiment, the booster pump facilitates in reducing the pressure to a value between 20 mbarA and 40 mbarA.

In one embodiment, the booster pump facilitates in reducing the pressure to a value between 10 mbarA and 20 mbarA.

In a second aspect, an air-cooling system is disclosed. The air-cooling system includes at least one dehumidification core defining an air channel and at least one vapor channel separated from the air channel. The dehumidification core further includes a membrane separating the at least one vapor channel from the air channel. The membrane is adapted to facilitate a removal of moisture from the air flowing through the air channel. Moreover, the membrane is selectively permeable to water and water vapor and impermeable to air. Also, the membrane includes an ion exchange capacity of at least 1.0 milliequivalents per gram. The air-cooling system further includes a water ejector having throat portion and an outlet portion disposed downstream of the throat portion. The throat portion is fluidly coupled to the at least one vapor channel, and is adapted to create a relatively lower pressure of water vapor within the at least one vapor channel than in the air channel. Further, the outlet portion is configured to increase the pressure of water to facilitate a condensation of the water vapors received from the at least one vapor channel. The air-cooling system further includes a reservoir for storing the water and configured to receive the water from the water ejector, and a pump fluidly connected to the water ejector and the reservoir. The pump is configured to supply the water from the reservoir to the water ejector. Furthermore, the air-cooling system has an evaporative cooler for cooling the air by facilitating an absorption of water into the air. The evaporative cooler is disposed downstream or upstream of the at least one dehumidification core.

In one embodiment, the air-cooling system further includes a reservoir adapted to receive the liquid water from the water ejector and stores the liquid water. The air-cooling system also includes a pump fluidly connected to the water ejector and the reservoir, and configured to supply the liquid water from the reservoir to the water ejector.

According to some embodiments, the reservoir includes a drain valve for facilitating a drainage the liquid water from the reservoir when a level of the liquid water reaches above a first threshold level.

In some embodiments, the reservoir is made of a thermally conductive material to facilitate a heat transfer from the liquid water stored inside the reservoir to an ambient.

In embodiments, the air-cooling system further includes a heat exchanger fluidly connected to the water ejector and configured to receive at least a portion of the liquid water exiting the water ejector. The heat exchanger is configured to cool the received liquid water.

In some embodiments, the heat exchanger is disposed upstream of the reservoir and supply the cooled liquid water to the reservoir.

According to one embodiment, the heat exchanger is an air to liquid heat exchanger.

According to some embodiments, the membrane includes sulfonated block copolymers.

In embodiments, the membrane includes an ion exchange capacity of at least 1.0 milliequivalents per gram.

In one embodiment, the air-cooling system further includes a booster pump arranged between the dehumidification core and the water ejector to reduce the pressure inside the vapor channels to a pressure below a partial vapor pressure of water.

In one embodiment, the booster pump facilitates in reducing the pressure to a value less than equal to 31.7 mbarA at 25 degree Celsius.

In one embodiment, the booster pump facilitates in reducing the pressure to a value less than 150 mbarA.

In one embodiment, the booster pump facilitates in reducing the pressure to a value between 20 mbarA and 40 mbarA.

In one embodiment, the booster pump facilitates in reducing the pressure to a value between 10 mbarA and 20 mbarA.

In some embodiments, the evaporative cooler is a first evaporative cooler disposed upstream of the dehumidification core and is adapted to cool the air flowing to the dehumidification core. The air-cooling system further includes a second evaporative cooler disposed downstream of the dehumidification core and configured to cool the air received from the dehumidification core.

DESCRIPTION

Figure 1:
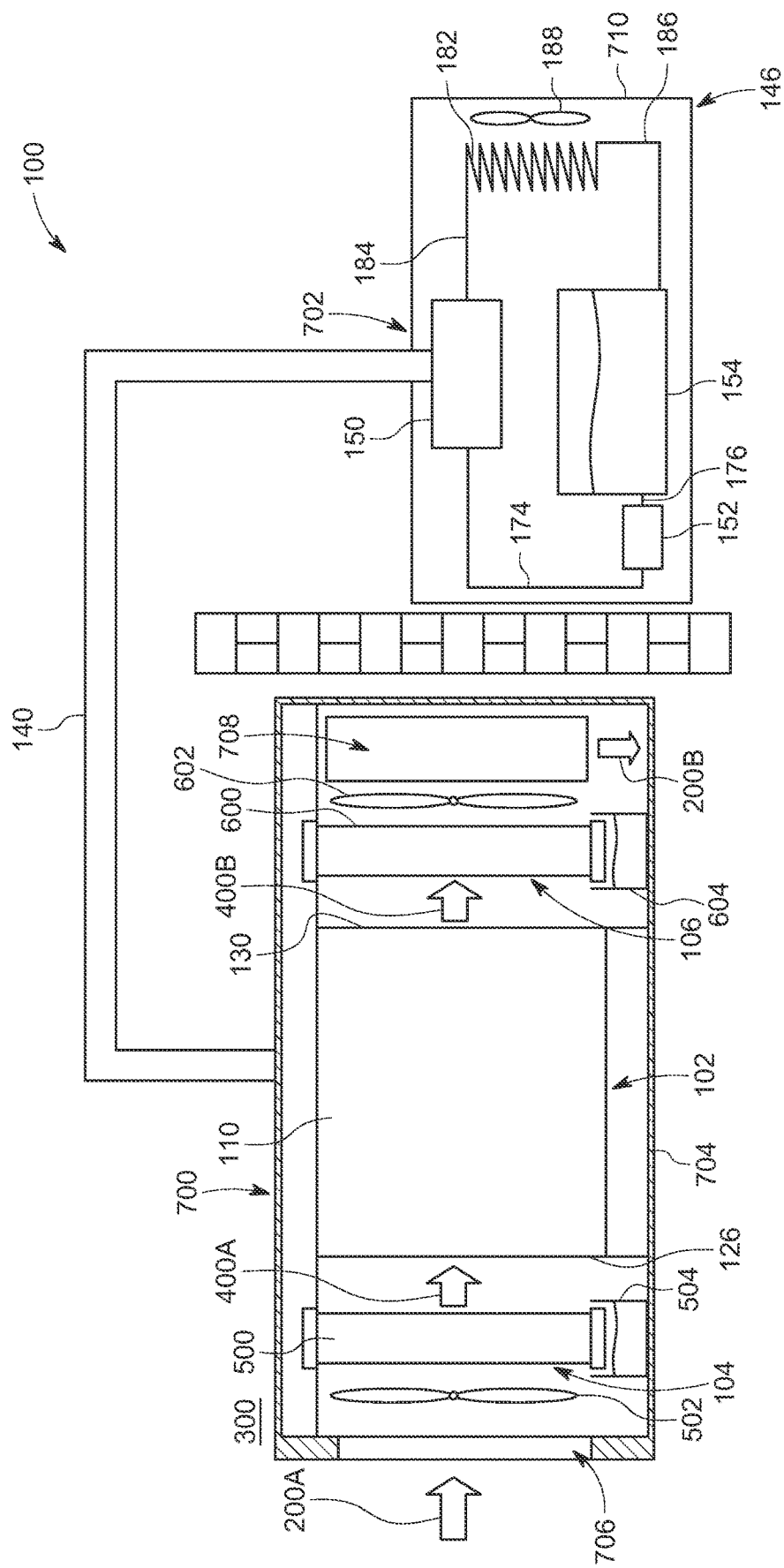
FIG. 1 is a schematic view of an embodiment of an air-cooling system having a dehumidification system.

The disclosure relates to dehumidification systems to remove moisture from air. In embodiments, the dehumidification systems facilitate removal of moisture from the air to reduce humidity level in the air supplied to a room with minimal consumption of energy. The dehumidification system includes at least one dehumidification core with at least a membrane adapted to facilitate a removal of moisture from the air flowing through an air channel. The dehumidification system includes a water ejector to create a vacuum inside a vapor channel to extract moisture from air flowing through the air channel. In embodiments, a booster pump is included to further reduce the pressure inside the vapor channels. The dehumidification system can be used for an air cooling system.

Water (Liquid) Elector: It is noted that the term "water ejector" is used in the disclosure here as water is a readily available media for use with the ejector, and water from vapor channel would separate in the tank and drained off that way. However, other liquids can be used with the ejector, e.g., oils of varying viscosities. A reference to "water" also includes other liquids as used in the disclosure herein.

The water ejector works on a venturi effect and has a throat portion that has a relatively less diameter and through which the water is pumped. As the water flows through the throat portion, a velocity or a speed of the water increases, resulting into a low-pressure inside the throat portion. The low pressure is communicated to the vapor channels via a conduit. In this manner, the water ejector facilitates in creating a pressure differential between the air channels and the vapor channels of the dehumidification core to enable a flow of the moisture from the air flowing through the air channel to the vapor channels. To control a reduction of the pressure inside the throat portion, a velocity and a volume of the water entering an inlet portion of the water ejector is controlled.

In embodiments, the water ejector may generate a vacuum pressure of 40 mbarA to 120 mbarA. It may be appreciated that vacuum generation capacity of the water ejector is limited by the saturation vapor pressure of the water. In embodiments, the water ejector may create a pressure of less than or equal to −960 mbar gage pressure.

To further increase a vacuum level inside the vapor channels or decrease/reduce the pressure inside the vapor channels, the dehumidification system, in embodiments, includes a booster pump arranged between the dehumidification core and the water ejector.

Booster Pump: The booster pump is a root pump that generally includes at least a pair of meshing lobes rotating in opposite directions. Fluid is trapped in pockets surrounding the lobes and carried from the inlet side to outlet side. The booster pump facilitates in decreasing the pressure inside the vapor channels to a pressure less than or equal to a partial vapor pressure of water.

Partial vapor pressure of water at 25° C. is less 31.7 mbarA. In embodiments, the booster pump in combination with the water ejector facilitates a creation of pressure less than or equal to 20 mbarA inside the vapor channels. In some embodiments the booster pump facilitates in reducing the pressure to a value between 10 mbarA to 20 mbarA, or <=10 mbarA, or between 20-40 mbarA, or <150 mbarA. The booster pump and the water ejector may be controlled to generate a vacuum (i.e., pressure) inside the vapor channels depending upon the amount of cooling and the water removal rate. For example, for a large system, such as a commercial air-cooling system and the dehumidification system wherein a relatively greater amount of water extraction rate is needed, the booster pump may facilitate in reducing pressure inside the vapor channels to less than 10 mbar. In such cases, multi-stage booster pump may be utilized. Alternatively, for a small establishment where a relatively less water vapor extraction rate is needed, a pressure corresponding to 10-20 mbar inside the vapor channel is sufficient. In such a case, a single stage booster pump may be utilized. Further, the speed of the booster pump may be controlled to vary the pressure inside vapor channels. By using the booster pump, the pressure differential between the air channels and the vapor channels is increased, resulting into increased water removal rate from the air flowing through the dehumidification core.

Membrane: is characterized has having favorable ion-exchange capacity and proton conductivity, and glass transition temperature, providing both flexibility and material strength, and good stability and swelling properties even when hydrated. The membrane is formed mostly or substantially entirely from a sulfonated copolymer (SC) being sufficiently sulfonated to contain from 10-100 mol % sulfonic acid or sulfonate salt functional groups based on the number of monomer units in the copolymer. In embodiments, the SC is used to form a coating on a substrate surface with the substrate made of same or different material. In other embodiments, the membrane is used as a single or multiple SC layers or films, each with a certain or preselected thickness.

In embodiments, the SC is a sulfonated block copolymer having a block copolymer molecular architecture with three or more blocks, designed to phase separate and form ion-conducting domains which enable water transmission, process that can be accelerated through application of voltage. In embodiments, the SC is selected from the group of perfluorosulfonic acid polymers such as sulfonated tetrafluoroethylene copolymer, polystyrene sulfonates, sulfonated block copolymers, polysulfones such as polyether sulfone, polyketones such as polyether ketone, and mixtures thereof.

In embodiments, the sulfonated polymer is characterized as being sufficiently or selectively sulfonated to contain from 10-100 mol % sulfonic acid or sulfonate salt functional groups based on the number of sulfonatable monomer units in the sulfonated copolymer ("degree of sulfonation"). In embodiments, the sulfonated polymer has a degree of sulfonation of >25 mol %, or >50 mol %, or <95 mol %, or 25-70 mol %.

In embodiments, the sulfonated polymer is characterized as having self-sterilizing effect, for killing at least 99% of microbes within 5 minutes of coming into contact with the coating material.

In embodiments, the sulfonated polymer is a sulfonated block copolymer, having one or more copolymer block configurations corresponding to any of A-B-A, A-B-A-B-A, $(A-B-A)_nX$, $(A-B)_nX$, A-D-B-D-A, A-B-D-B-A, $(A-D-B)_nX$, $(A-B-D)_nX$ or mixtures thereof, where n is an integer from 2 to about 30, X is a coupling agent residue, and wherein each D block is preferably a polymer block resistant to sulfonation. In embodiments, the SC has a linear structure corresponding to A-B-A, $(A-B)_2X$, A-B-D-B-A, $(A-B-D)_2X$, A-D-B-D-A, and $(A-D-B)_2X$, or a radial structure corresponding to $(A-B)_nX$ and $(A-D-B)_nX$, where n ranges from 3 to 6. Two or more of the A, B, C, and D-blocks may be the same or different.

In embodiments, the A-blocks are polymer segments of acrylic esters or methacrylic esters. In embodiments, the A-blocks are selected from polymerized para-substituted styrene monomers, ethylene, alpha olefins of 3 to 18 carbon atoms, 1,3-cyclodiene monomers, monomers of conjugated dienes having a vinyl content less than 35 mol percent prior to hydrogenation, acrylic esters, methacrylic esters, and mixtures thereof. If the A-blocks are polymers of 1,3-cyclodiene or conjugated dienes, the blocks are preferably hydrogenated after polymerization of the block copolymer and before sulfonation of the block copolymer. If the A-blocks are hydrogenated polymers of 1,3-cyclodiene monomers, such monomers may be selected from the group consisting of 1,3-cyclohexadiene, 1,3-cycloheptadiene and 1,3-cyclooctadiene. The A-blocks may contain up to 15 mol percent of the vinyl aromatic monomers such as those present in the B blocks.

The B blocks may contain from about 10 to about 100 mol percent sulfonic acid or sulfonate ester functional groups based on the number of monomer units, and comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenyl ethylene monomer, and mixtures thereof.

The D-block may comprise a hydrogenated polymer or copolymer of a conjugated diene selected from isoprene, 1,3-butadiene, and mixtures thereof.

X is a coupling agent residue, with the coupling agent selected from those known in the art, including polyalkenyl coupling agents, dihaloalkanes, silicon halides, siloxanes, multifunctional epoxides, silica compounds, esters of monohydric alcohols with carboxylic acids, (e.g. methylbenzoate and dimethyl adipate) and epoxidized oils.

In embodiments, the SC is hydrogenated sulfonated block copolymer having the general configuration A-B, A-B-A, (A-B).sub.n, (A-B-A)$_n$, (A-B-A)$_n$X, (A-B)$_n$X or mixtures thereof, where n is an integer from 2 to about 30, and X is coupling agent residue. Prior to hydrogenation, each A block is a mono alkenyl arene polymer block and each B block is a controlled distribution copolymer block of at least one conjugated diene and at least one mono alkenyl arene. Subsequent to hydrogenation about 0-10% of the arene double bonds have been reduced, and at least about 90% of the conjugated diene double bonds have been reduced. Each A block has a number average molecular weight between about 3,000 and about 60,000. Each B block has a number average molecular weight between about 30,000 and about 300,000. Each B block comprises terminal regions adjacent to the A blocks that are rich in conjugated diene units and one or more regions not adjacent to the A blocks that are rich in mono alkenyl arene units. The total amount of mono alkenyl arene in the hydrogenated block copolymer is about 20 percent by weight to about 80 percent by weight. The weight percent of mono alkenyl arene in each B block is between about 10 percent and about 75 percent; at least 25% of the aromatic rings of the alkenyl arene are sulfonated. The hydrogenated sulfonated block copolymer has an ionic conductivity greater than 0.08 siemens/cm.

Examples of SC that may be used are disclosed in published U.S. Pat. No. 8,222,346, and patent application nos. US20130108880A1 and US20140014289A1, incorporated herein by reference in their entirety. The SC may be prepared by anionic polymerization such as those disclosed in patent publications US20130108880A1 and US20140014289A1, incorporated herein by reference in their entirety. In various embodiments, the process may comprise polymerizing the suitable monomers in solution with a lithium initiator. The prepared block copolymers are sulfonated to obtain a sulfonated polymer product in solution and in micellar form. After sulfonation reaction, the block copolymers can be cast directly forming a membrane or film.

In embodiments, the sulfonated copolymer is a sulfonated tetrafluoroethylene copolymer having a polytetrafluoroethylene (PTFE) backbone; side chains of vinyl ethers (e.g., —O—$CF_2$—CF—O—$CF_2$—$CF_2$—) which terminate in sulfonic acid groups in a cluster region.

In embodiments, the sulfonated polymer is a polystyrene sulfonate, examples include potassium polystyrene sulfonate, sodium polystyrene sulfonate, a co-polymer of sodium polystyrene sulfonate and potassium polystyrene sulfonate (e.g., a polystyrene sulfonate copolymer), having a molecular weight of >100,000 Daltons, >400,000 Daltons, and up to 1,500,000 Daltons. The polystyrene sulfonate polymers can either be crosslinked or uncrosslinked. In embodiments, the polystyrene sulfonate polymers are uncrosslinked and water soluble.

In embodiments, the sulfonated polymer is a polysulfone, selected from the group of aromatic polysulfones, polyphenylenesulfones, aromatic polyether sulfones, dichlorodiphenoxy sulfones, sulfonated substituted polysulfone polymers, and mixtures thereof. In embodiments, the sulfonated polymer is a sulfonated polyethersulfone copolymer, which can be made with reactants including sulfonate salts such as hydroquinone 2-potassium sulfonate (HPS) with other monomers, e.g., bisphenol A and 4-fluorophenyl sulfone. The degree of sulfonation in the polymer can be controlled with the amount of HPS unit in the polymer backbone.

In embodiments, the sulfonated polymer is a polysulfone is a polyarylether ketone, e.g, a sulfonated polyether ketone (SPEEK), obtained by sulfonating a polyetherketonketone (PEKK). The polyether ketone ketone is manufactured using diphenyl ether and a benzene dicarbonic acid derivative. The sulfonated PEEK is available as an alcohol and/or water-soluble product for subsequent used for coating membranes, for casting into membranes and films.

With the use of the sulfonated copolymer, the SC membrane is hydrophilic and hygroscopic, and also permeable to moisture but not air and gases such as nitrogen and oxygen. The membrane containing sulfonated copolymer is characterized as selectively permeable with ion exchange properties. The SC membrane is also characterized as having excellent moisture vapor transport rates (MVTR) characteristics and excellent ionic exchange capacity.

The SC membrane is also characterized as undergoing considerable swelling when it absorbs water, e.g., at least 100% at ambient temperature. In embodiments with the use of sulfonated block copolymer having a degree of sulfonation (e.g., at least 25 mol %), the SC membrane also shows anti-bacterial properties, making the AC particularly useful for sterilizing air in addition to cooling, in indoor spaces.

In embodiments, the SC has an IEC of >0.5 meq/g, or 1.5-3.5 meq/g, or >1.25 meq/g, or >2.2 meq/g, or >2.5 meq/g, or >4.0 meq/g, or <4.0 meq/g.

In embodiments, the SC membrane (film) or a coating containing SC has a thickness of >1 μm, or >5 μm, or 5-50 μm, or <100 μm, or <75 μm, or <μm. In embodiments, the membrane/coating may comprise nanocomposite materials and can have an average pore size <1 μm, or <0.5 μm, or <0.1 μm.

In embodiments, the membrane is largely impermeable to air, e.g., having air permeability to be less than say less than 5 g/m^-day.

In use, moisture from air can be extracted by a water permeable membrane by creating a pressure differential between the inlet side and the downstream end or section of a membrane assembly, which drives the diffusion of the water molecules from the inlet side towards the other side of the membrane.

Depending on the unit, e.g., dehumidification unit or evaporative cooling unit, the SC membrane may be in forms other than sheets, e.g., netting, screen mesh or lattice, woven, non-woven, perforated or apertured plate, a foam, a hollow fiber membrane, or a pad having interconnecting interstices and passageways throughout the body, having the SC coated or bonded thereon. In embodiments, the SC membranes can be in spiral form or arranged in stacks, either parallel or perpendicular to the air stream direction.

In embodiments, the SC membrane is in the form of hollow fibers. Humid air flows through the hollow fibers, which are under vacuum. The hollow fibers provide a large dehumidification surface area and may be oriented parallel or perpendicular to the air flow. When the inside of the hollow fiber membrane is placed under vacuum, an osmotic gradient is generated between each of the fiber's hollow core (which are substantially under vacuum) and the fiber's outer surface. In embodiments of hollow membranes, SC coatings or films may be applied on the inner, outer, or both inner and outer surfaces of the hollow fibers. Hollow fiber membranes are known in the art, e.g., as disclosed in U.S. Pat. No. 5,762,798, which is incorporated herein by reference.

The membrane may comprise SC bonded or incorporated onto a frame, another one or more membranes, a polymer matrix, or a plurality of fiber bundles by processes known in the art, e.g., casting. The SC membrane can also be applied as a coating on a fiber matrix, or on the fan blades in the evaporative cooler.

The membrane can be bonded to a frame or another perforated layer serving as a support structure through which air and humidity can flow freely. A frame may comprise a metal or plastic and may be formed into any conceivable geometry, including, but not limited to, honeycomb and corrugated structures. In embodiments, the frame may have a honeycomb, spiral, non-woven or a plurality of porous designs for high surface area, with the proton conducting membrane being employed on multiple sides and with one side as opening for the air to flow in. In other embodiments, the frame is shaped as corrugated sheets with channels for increased exposed area. Depending on, for example, the amount of moisture to be removed or the size of the room, the number of membrane frames may also be varied by adding or taking out one or more frames.

The form-retaining frame can be thermally or mechanically formed and are preferably rigid, semi-rigid, or substantially rigid. As used herein, a rigid, semi-rigid or substantially rigid frame is a frame comprising a material or structure able to maintain its shape under its own weight. Suitable frame materials include fiberglass, aluminum, carbon, or a rigid polymer based on polyester, polyethylene, polypropylene, polyethylene terephthalate, polyvinylchloride, a styrene/acrylonitrile/butadiene copolymer, nylon, polytetrafluoroethylene, aramid-based polymeric fibers, metal, metal alloys, cellulose, cellulose nitrate, cellulose acetate, and combinations thereof.

A single frame may support a single membrane in each side, or the membrane assembly may comprise two or more membranes each supported by a frame connected in parallel in series to allow for a higher required voltage for mass fluxes on the order of $10^{-9}$ kg/s-cm$^2$. In one embodiment, a 5-ton air conditioning unit with a sensible heat ratio of about 0.6 would require less than 30 m$^2$ of SC membrane with IEC of at least 0.5, or >0.75, or >1.0 meq/g.

The frame preferably has a thickness sufficient to maintain strength and without interfering with air flow or moisture transport. The frame thickness may range from about 25 microns to about 500 microns, from about 100 microns to about 500 microns, or from 200 microns to 500 microns, or at least 300 microns. The thickness typically depends on multiple factors including the number of stacked layers of frames used, air flow rate, and pressure.

A frame may be porous with pore size sufficient to permit direct air contact without interfering with moisture transport or significant pressure drop. The pore diameter can range from 0.1 to 200 microns, such as around 5 microns, up to around 8-10 mm, or larger, with the frame surface between the pores sufficient for a film or coating comprising, for example, selectively permeable and ion exchanging polymer, to be bonded onto the frame and maintain film attachment.

When SC polymer is to be applied onto membranes, matrix, fibers, etc., as a coating, the coating can be prepared using different base solvents depending on, for example, the desired coating thickness or the membrane's intended application, e.g., whether the membrane is for a dehumidifier or evaporative cooler.

In embodiment of an evaporative cooler, a SC-mediated evaporative cooling process is achieved through the evaporation of water supplied to the evaporative cooler membrane, which serves as a substrate that allows thermal energy transfer between the relatively warm, dehumidified flowing air and the cooler water molecules at or near the membrane surface over which the warm, dehumidified air flows.

The thermal energy from the relatively warm flowing air molecules near the membrane surface can be absorbed by the cooler water molecules at or near the membrane's surface, which leads to cooling of the flowing air and evaporation of the water molecules from the membrane surface. Thermal energy transfer may also occur through collisional energy transfer between the relatively cooler (lower energy) water vapor molecules that evaporated from the membrane surface and the relative warm (higher energy), flowing air molecules. Also, a vapor pressure differential on opposite membrane surfaces facilitate water evaporation from the lower vapor pressure side of the membrane.

Reference will be made to the figures, showing various embodiments of the fixture and methods for using thereof.

Referring to FIG. 1, an air-cooling system 100 having a dehumidification system 102 according to an embodiment is shown. The air-cooling system 100 receives an incoming air stream (hereinafter referred to as a first air stream) 200A into a room 300 and delivers or generates an air having relatively less moisture content and a reduced temperature (hereinafter referred to as a second airstream 200B). The air-cooling system 100 includes the dehumidification system 102 for facilitating a removal of moisture (i.e., water vapors) from the air delivered into the room 300, and at least one evaporative cooler, for example, a first evaporative cooler 104 and a second evaporative cooler 106, for cooling (i.e., reducing a temperature) the air delivered into the room 300.

Figure 2A:
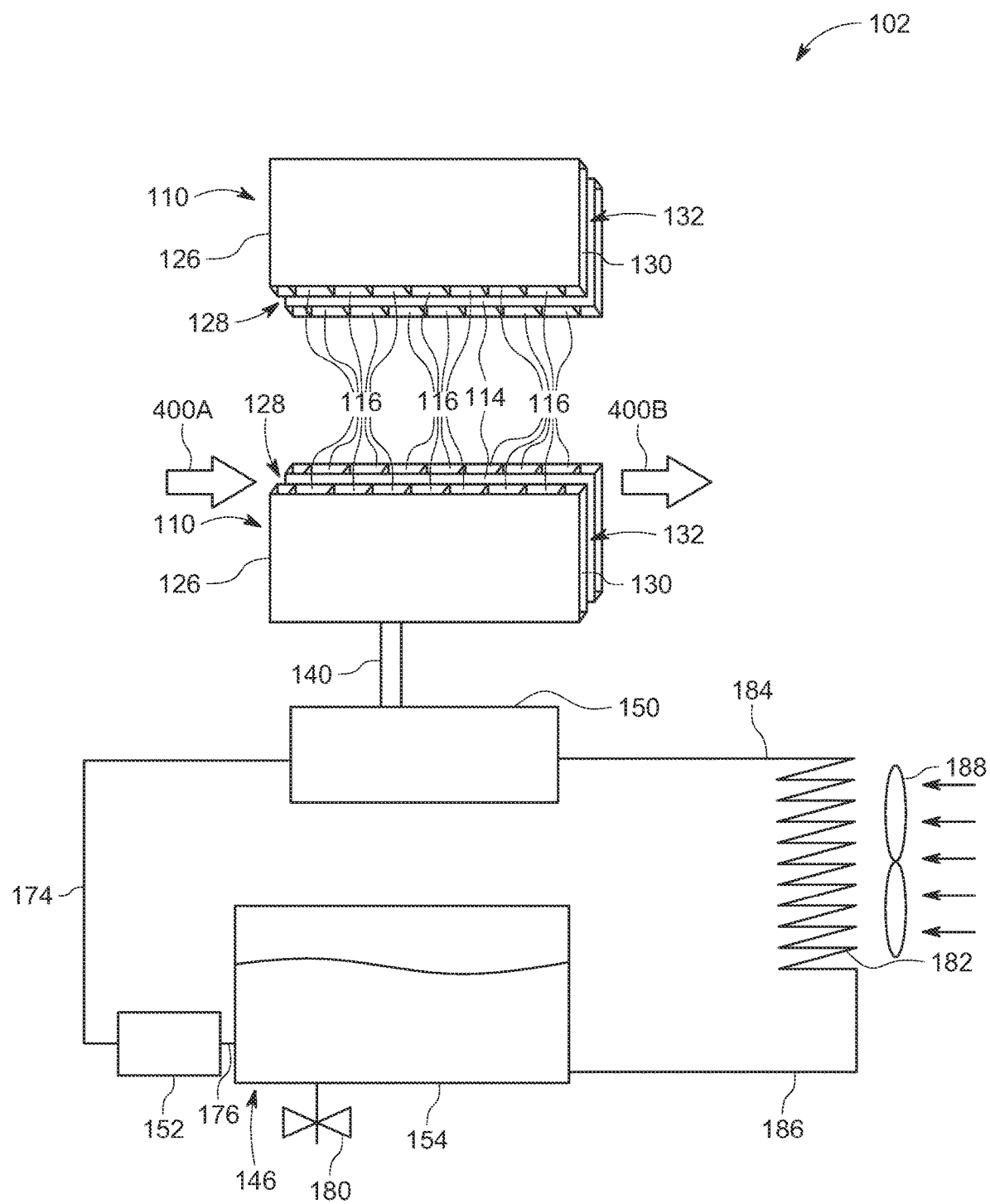
FIG. 2A illustrates a schematic view an embodiment of a dehumidification system having a dehumidification core having air channels separated from vapor channels by a membrane.
Figure 2B:
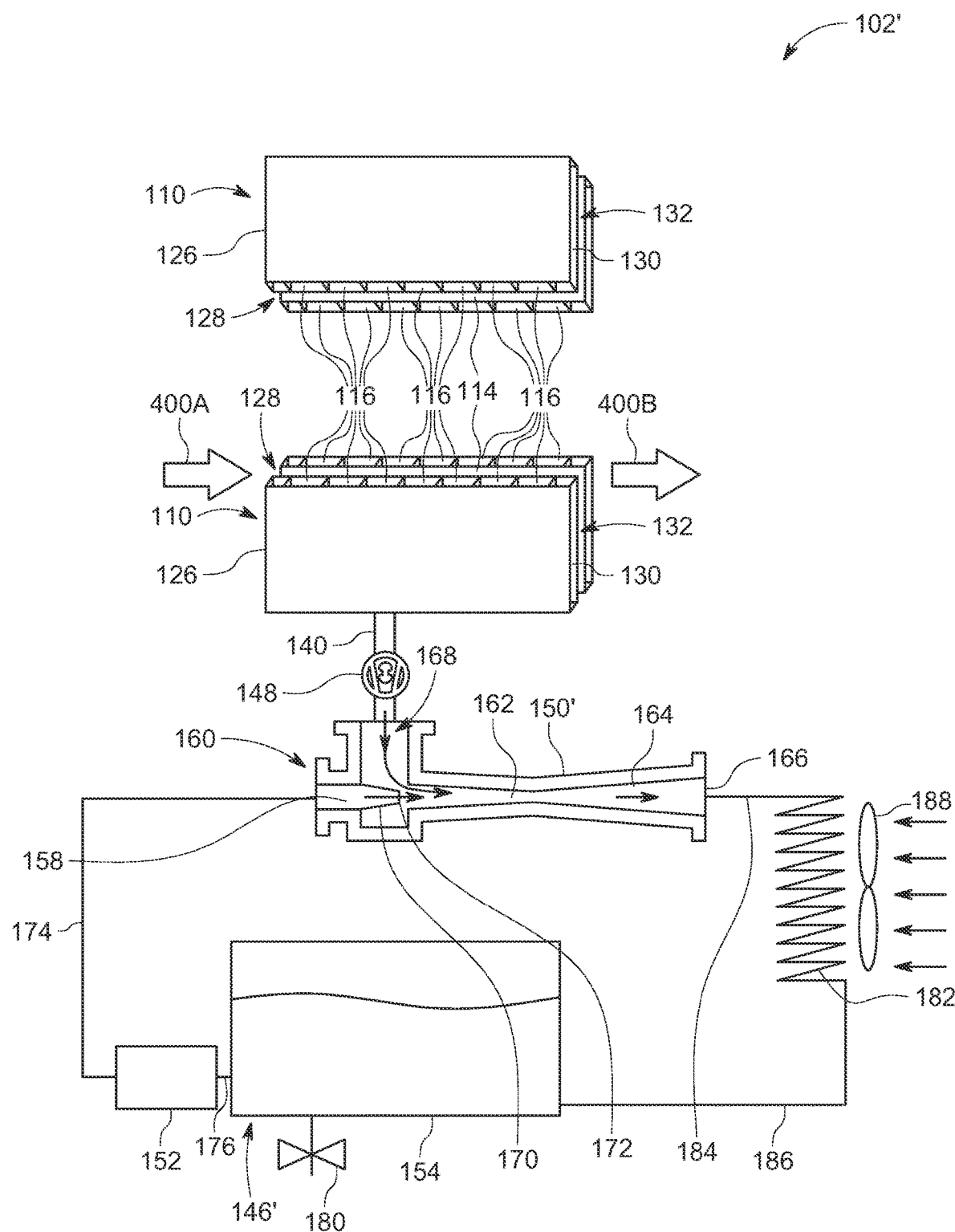
FIG. 2B illustrates a schematic view an embodiment of a dehumidification system having a dehumidification core having air channels separated from vapor channels by a membrane.

As shown in FIG. 1, FIG. 2A and FIG. 2B, the dehumidification system 102 includes a dehumidification core 110 that receives an air 400A having relatively high moisture content (also referred to as inlet air 400A) and discharges an air 400B having relatively low moisture content (also referred to as outlet air 400B). For so doing, referring to FIGS. 2A, 2B, 3, 4, and 5, the dehumidification core 110 defines at least one air channel 114 through which the inlet air 400A flows, and at least one vapor channel 116 that receives moisture (e.g., water vapors 120 extracted from the inlet air 400A) flowing through the at least one air channel 114. As shown, each vapor channel 116 is disposed adjacent to one or more of the air channels 114 and is separated by a membrane 122. Conversely, each air channel 114 is disposed adjacent to one or more of the vapor channels 116 and is separated from the adjacent vapor channels 116 by the membrane 122.

Figure 3:
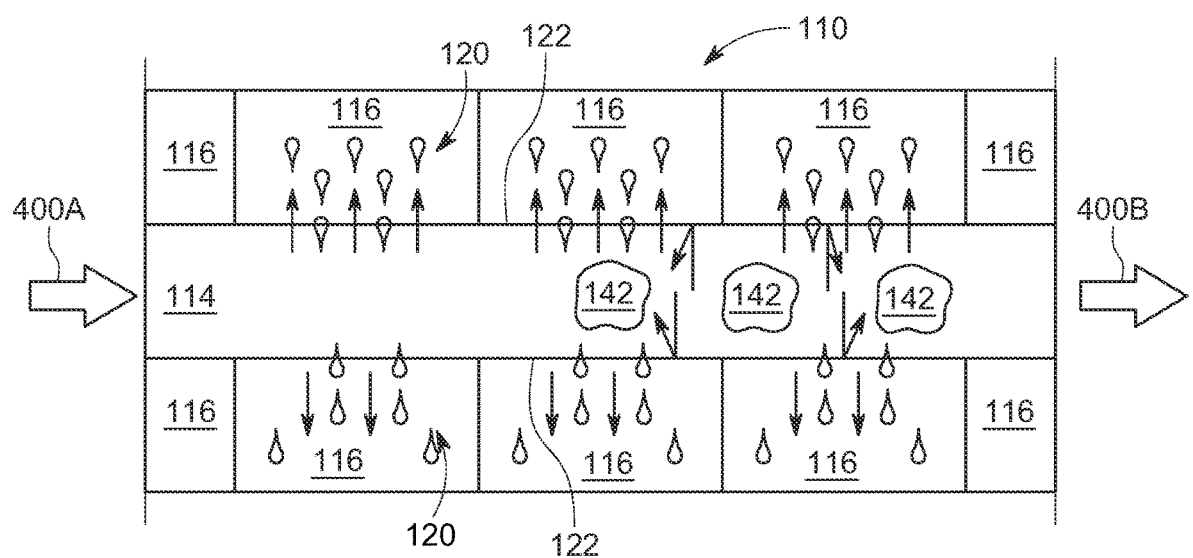
FIG. 3 is a schematic top view of a portion of an embodiment of a dehumidification core, having a flow of the water vapors from the air flowing through the air channel to the vapor channels.
Figure 4:
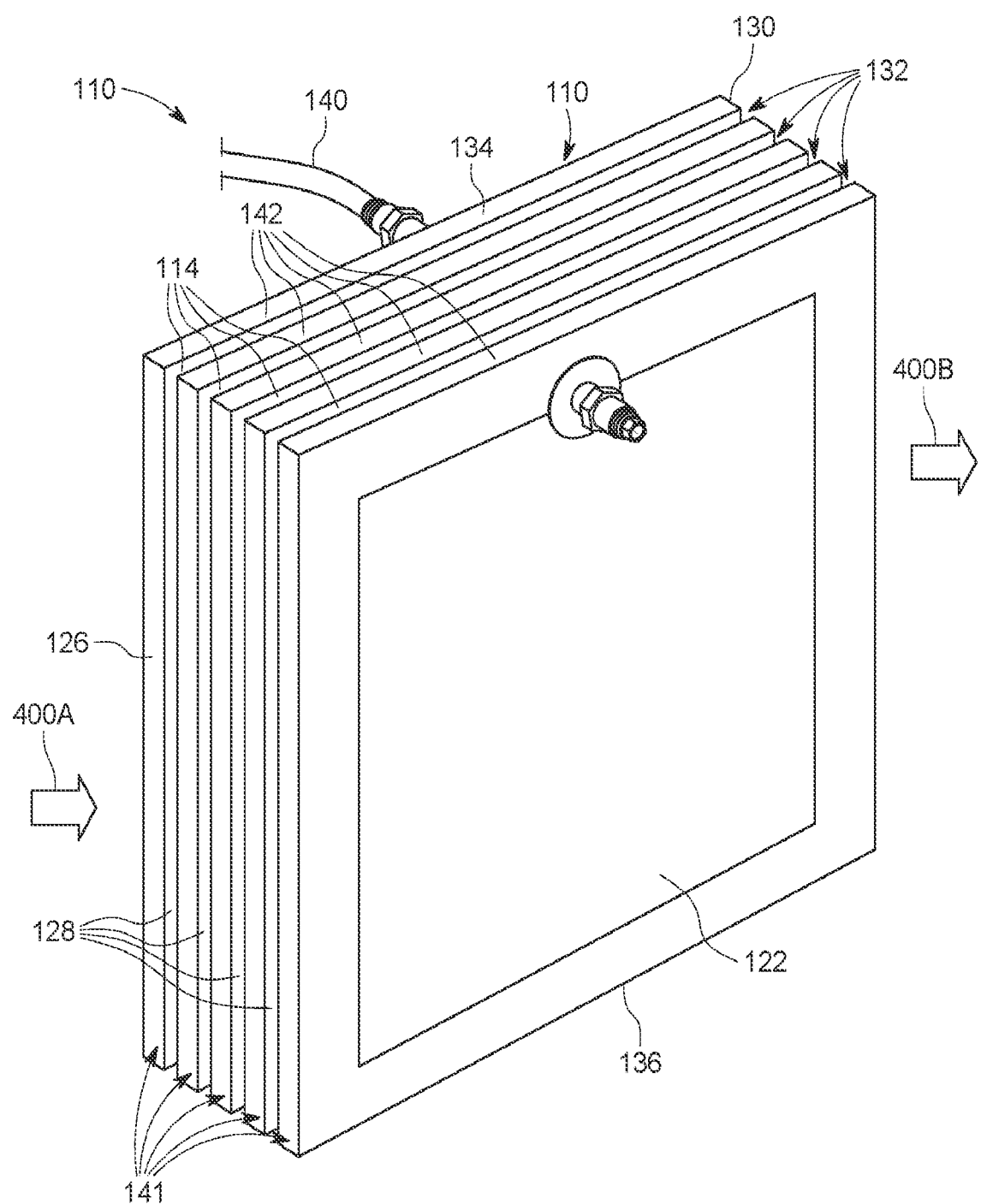
FIG. 4 is perspective view of an embodiment of a dehumidification core having air channels extending from a first face to a second face.

In embodiments, as shown in FIG. 4, the dehumidification core 110 has a box structure, with a first face 126 disposed substantially perpendicular to the flow of inlet air 400A and defining an inlet 128 for each of the air channel 114, and a second face 130 disposed substantially parallel to the first face 126 and defining an outlet 132 of each of the air channel 114. Accordingly, the inlet air 400A enters into the air channels 114 through the first face 126 and exits the dehumidification core 110 through the second face 130 as the outlet air 400B. The moisture (i.e., the water vapors 120) so removed from the inlet air 400A is collected into the vapor channels 116 (as shown in FIG. 3).

As shown, each vapor channel 116 may extend in a direction substantially perpendicular to a direction of extension of the air channels 114, and may extend in a direction substantially perpendicular to a third face 134 (i.e., top face 134) of the dehumidification core 110 and a fourth face 136 (i.e., bottom face 136) of the dehumidification core 110. Further, the fourth face 136 may define a closed end of each of the vapor channel 114, thereby preventing an exit of the water vapors 120 from the dehumidification core 110 through the bottom face 136, while an outlet 138 (shown in FIG. 5) for each vapor channel 114 may be disposed proximate to the top face 134 to facilitate an exit of the water vapors 120 from the vapor channels 116. In embodiments, the dehumidification core 110 may include one or more collection channels (not shown) disposed proximate to the top face 134 and in fluid communication with the outlets 138 of the vapor channels 116. In such a case, the outlets 138 may be defined by an intermittent surface of the dehumidification core 110 that may be disposed proximate to the top face 134 and extends parallel to the bottom face 136. In some embodiments, the one or more collection channels (not shown) may extend substantially parallel to the air channels 114 and may include closed ends at the first face 126 and the second face 130.

Figure 5:
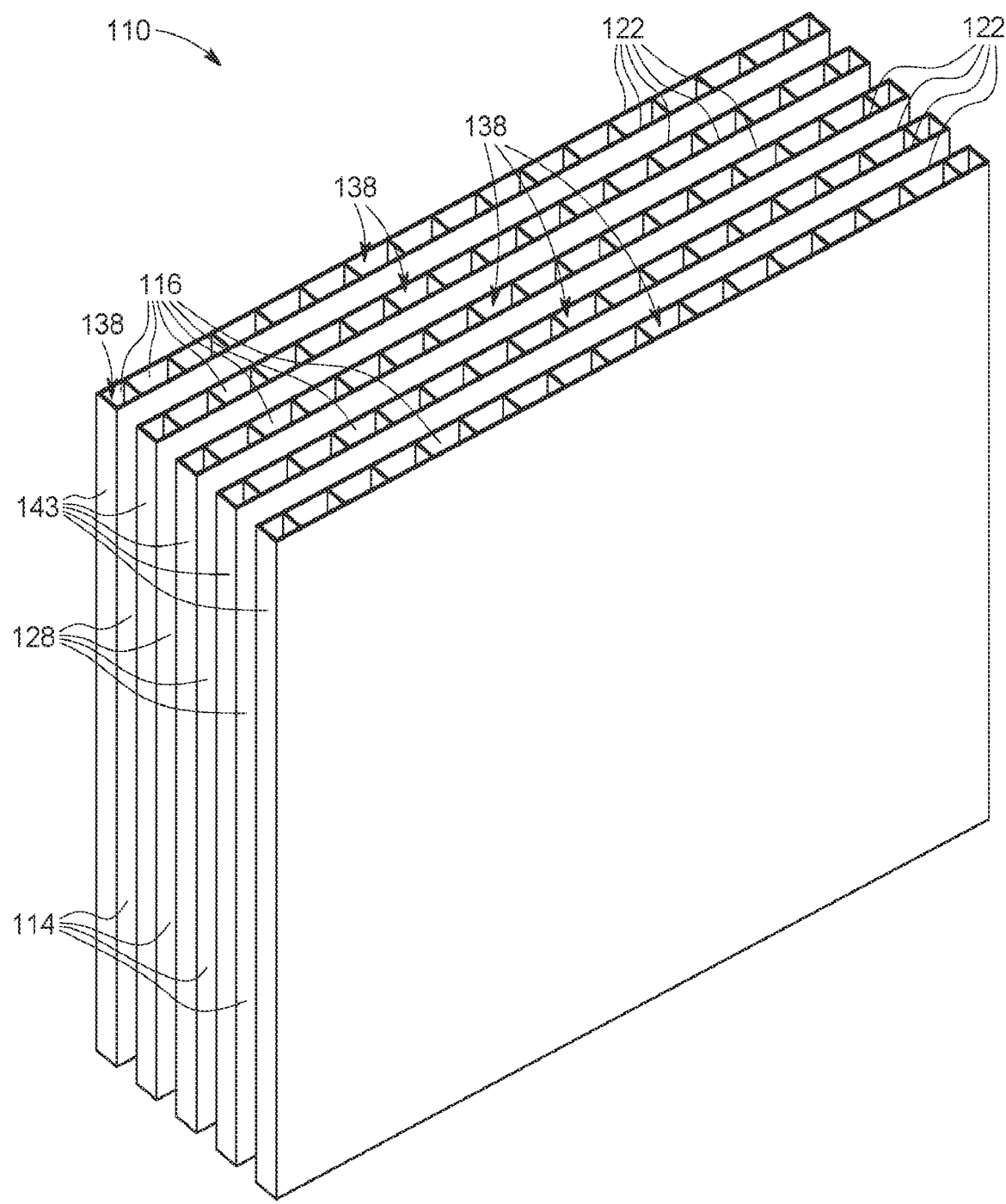
FIG. 5 is sectional view of the dehumidification core of FIG. 4, depicting the vapor channels extending substantially perpendicular to a direction of extension of air channels.

Also, as shown in FIG. 4 and FIG. 5, the dehumidification core 110 is formed by arranging a plurality of stacks 141 such the stacks 141 are arranged parallel to and spaced apart from each other to define air channels 114 therebetween. The stacks 141 are arranged in a manner such that membrane 122 of one stack 141 faces the membrane 122 of the adjacent stack 141. Further, each stack 141 includes an outer frame 142 and a corrugated structure 143 disposed inside the outer frame 142 and supported by the outer frame 141. As shown, the outer frame 142 is attached to an outer edge of the corrugate structure 143. Further each corrugated structure 143 defines the plurality of vapor channels 116 having a substantially rectangular shape. Further, each stack 143 includes two membranes 122, one membrane 122 disposed at a first side of the corrugated structure 143, and other membrane 122 disposed on second side, opposite to the first side, of the corrugated structure 143. Accordingly, the corrugated structure 143 is arranged between the two membranes 122, and each membrane 122 abuts the corrugated structure 143. Accordingly, the membrane 122 separates the vapor channels 116 of the corrugated structure 143 from the air channel 114 defined between two adjacent stacks 141.

Although a box, e.g., cuboidal structure having the vapor channels 116 extending substantially perpendicular to the air channels 114 is contemplated, it may be appreciated that that the dehumidification core 110 may include any other suitable shape or structure known in the art. Further, it may be envisioned that the air channels 114 and the vapor channels 116 may extend substantially in a same direction and may run parallel to each other. Also, the dehumidification core 110 having concentric air channels 114 and vapor channels 116 may also be envisioned. Further, the dehumidification core 110 may include a conduit 140 (shown in FIGS. 1, 2, and 4) in fluid communication with each vapor channel 116 to receive the water vapors 120 and facilitates an exit of water vapors 120 from the dehumidification core 110.

As shown in FIG. 3, the movement of the water vapors 120 from the air flowing through the air channels 114 to the vapor channels 116 is facilitated by the membrane 122, while flow of other components 144, for example, nitrogen, oxygen, carbon dioxide, etc., of the air from the air channels 114 to the vapor channels 116 is substantially blocked by the membrane 122. In some embodiments, the membrane 122 may block a flow of about 99 percent of the other components 144 from the air channels 114 to the vapor channels 116. In certain implementations, the membrane 122 may block a flow of about 95 percent to 99 percent of other components 144 from the air channels 114 to the vapor channels 116.

The membrane 122 facilitates an extraction of the water vapors 120 from the air flowing through the air channels 114 and flow of the water vapors 120 into the adjacent vapor channels 116, through the membrane 120, in response to a presence of relatively low pressure inside the vapor channels 116 than the air channels 114. As such, a humidity gradient is established between the air channels 114 and adjacent vapor channels 116. The humidity gradient is generated by creating a pressure gradient/differential between the air channels 114 and adjacent vapor channels 116. In particular, a partial pressure of water vapor inside the vapor channels 116 is maintained at a level lower than a partial pressure of water vapor inside the air channels 114 to pull the water vapors 120 in the air flowing through the air channels 114 toward the suction side (i.e., the vapor channels 116).

Figure 6:
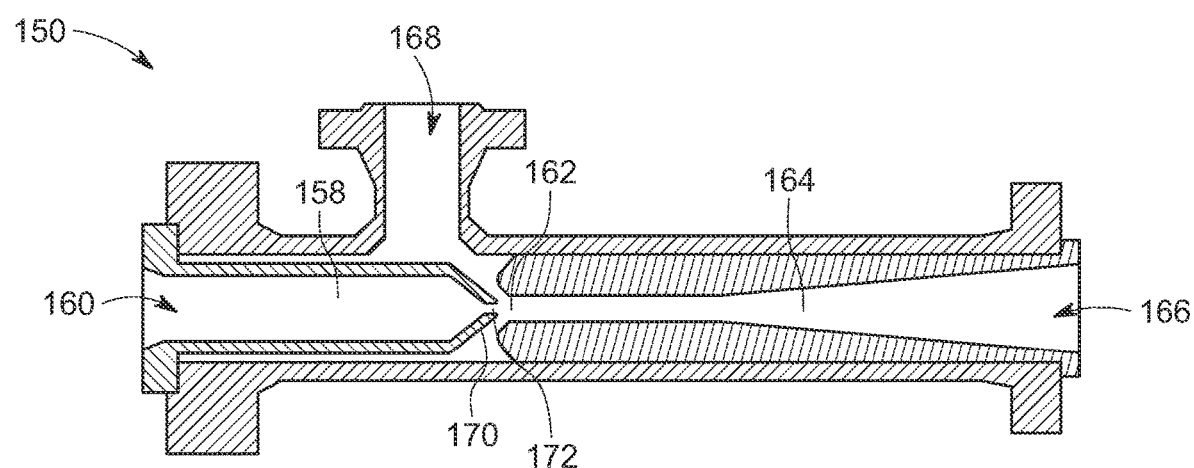
FIG. 6 is section view of an embodiment of a water ejector.

Again referring to FIG. 1 and FIG. 2A, to create/maintain a relatively lower pressure inside the vapor channels 116, the dehumidification system 102 may include a pressure reducer system 146 having a liquid ejector, such as, a water ejector 150, fluidly coupled to the vapor channels 116 via the conduit 140, a pump 152 to supply liquid water to the water ejector 150, and a reservoir 154 to store the liquid water and receive the liquid water expelled from the water ejector 150. As shown, the water ejector 150 is in fluid communication with the vapor channels 116 via the conduit 140 extending from the dehumidification core 110 to the water ejector 150. Accordingly, the water vapors 116 extracted from the inlet air 400A flow towards the water ejector 150 via the conduit 140 in response to creation of low pressure in the water ejector 150. As best shown in FIG. 6, the water ejector 150 includes an inlet portion 158 defining an inlet port 160 of the water ejector 150, a throat portion 162 extending from the inlet portion 158 in a longitudinal direction, and on outlet portion 164 extending from the throat portion 162 and defining an outlet port 166 of the water ejector 150. Also, the water ejector 150 defines a vapor inlet port 168 coupled to the conduit 149 and in fluid communication with the throat portion 162 to facilitate a creation/maintenance of relatively low pressure (i.e., vacuum) inside the vapor channels 116, and an entry of the water vapors 120 inside the water ejector 150 (i.e., the throat portion 162) from the vapor channels 116.

As shown in FIG. 6, the inlet portion 158 may include a nozzle portion 170 defining an orifice 172 to inject/supply the liquid water to the throat portion 162 at a relatively high speed, while a cross-sectional area of the outlet portion 164 increases, gradually, from the throat portion 162 to the outlet port 166 to decrease the speed to the liquid water received from the throat portion 162. In some embodiments, a cross-sectional area of the inlet portion 158 may decrease, gradually, from the inlet port 160 to the throat portion 162 to facilitate a gradual increase in velocity/speed of the liquid water. Accordingly, the inlet portion 158 facilitates in increasing the velocity/speed of the liquid water as the liquid water flows from the inlet port 160 to the throat portion 162, while the outlet portion 164 is configured to decrease the velocity/speed of the liquid water as the liquid water flows from the throat portion 162 to the outlet port 166. Consequently, the pressure of the liquid water at the throat portion 162 is lower relative to the pressure of the water at the inlet port 160 and the outlet port 166. A level of the pressure (i.e., vacuum) at the throat portion 162 may be adjusted/controlled by controlling a velocity or amount of water entering the inlet portion 158. As such, the throat portion 162 is in fluid communication with the vapor channels 116 of the dehumidification core 110, therefore, a vacuum (i.e., reduced pressure) is created inside the vapor channels 116. The level of pressure at the throat portion 162 is controlled in such a manner that the reduced pressure created inside the vapor channels 116 is lower than the pressure in the air channels 114 by a desired value. Accordingly, the velocity of the liquid water entering the water ejector 150 is controlled so as to maintain the pressure inside the vapor channels 116 lower than the pressure of air inside the air channels 114 by the desired value so as to facilitate an extraction and flow of the water vapors 120 from the inlet air 400A to the vapor channels 116 through the membrane 122. However, the reduced pressure created/maintained inside the vapor channels 116 may be higher than the pressure inside the throat portion 162 due to loss of vacuum along the conduit 140.

In order to control and provide a flow of water to the water ejector 150, the dehumidification system 102 includes the pump 152 disposed upstream of the water ejector 150 and fluidly connected to the inlet port 160 via first pipe 174. In embodiments, the pump 152 may be a variable displacement pump to allow a control of the amount of water being pumped. Further, the pump 152 may be connected to the reservoir 154, via the second pipe 176, to receive the liquid water from the reservoir 154 and provide the liquid water at a desired velocity/speed to the water ejector 150. In embodiments, the reservoir 154 may include a plurality of fins (not shown) along an outer surface of the reservoir 154 to facilitate a transfer of heat between the liquid water stored inside the reservoir 154 and ambient. In some embodiments, the reservoir 154 is made of a material having high thermal conductivity to facilitate a heat transfer between the liquid water stored inside the reservoir 154 and the ambient. Also, the reservoir 154 is fluidly connected to the outlet portion 164 (i.e., the outlet port 166) of the water ejector 150 and is adapted to receive the liquid water exiting the water ejector 150. Further, the reservoir 150 may include a drain valve 180 adapted to facilitate a draining of liquid water from the reservoir 154. The drain valve 180 is adapted to move to an open position to drain the water out of the reservoir 154 when a level of the liquid water reaches beyond a first threshold level. In this manner, the drain valve 180 facilitates in maintaining the level of liquid water inside the reservoir 154 below the first threshold level.

In some embodiments, at least a portion of the liquid water exiting the water ejector 150 is cooled down before being supplier to the reservoir 154. For so doing, the pressure reduce system 146, and hence the dehumidifier system 110, may include a heat exchanger 182 to cool (i.e., reduce a temperature) the liquid water expelled by the water ejector 150. The heat exchanger 182 may be an air to liquid heat exchanger, and may be disposed downstream of the water ejector 150 and upstream of the reservoir 154 and adapted to receive the liquid water from water ejector 150 and supply cooled liquid water to the reservoir 154. As shown, the heat exchanger 182 is fluidly connected to the outlet port 166 vis a third pipe 184 and receive the liquid water from the water ejector vis the third pipe 184. Similarly, the heat exchanger 182 is fluidly connected to the reservoir 154 via a fourth pipe 186 and supply the cooled liquid water to the reservoir 154 via the fourth pipe 186. In some implementations, only a portion of the liquid water expelled from the water ejector 150 is provided to the heat exchanger 182 by a bypass conduit. In embodiments, the portion of the liquid water, cooled by the heat exchanger 182, is mixed with a remaining portion of liquid water before the liquid water enters the reservoir 154. In some implementations, the portion of liquid water, cooled by the heat exchanger 182, may directly flow/enters the reservoir 154. In embodiments, the pressure reducer system 146 may include a blower 188 to increase a flow of air towards the heat exchanger 182 to facilitate the cooling of the liquid water flowing through the heat exchanger 182. The blower 188 may be disposed upstream or downstream, in a direction of flow of air) of the heat exchanger 182. In embodiments, a heat exchanger may be disposed between the water ejector 150 and the dehumidification core 110 to facilitate a cooling of the water vapors exiting the dehumidification core 100. In such a case, the heat exchanger 182 and the associated blower 188 may be omitted.

Referring to FIG. 2B, a dehumidification system 102' having a pressure reducer system 146' according to an alternative embodiment is shown. The pressure reducer system 146' is similar to the pressure reducer system 146 except that a booster pump 148 is arranged between a water ejector 150' and the dehumidifier core 110. The booster pump 148 enables a further reduction of pressure, hence increase in vacuum, inside the vapor channels 116 of the dehumidification core 110. In embodiments, the booster pump 148 may facilitate in reducing and maintaining the pressure inside the vapor channels 116 below a threshold value. In some embodiments, the threshold value corresponds to a saturation vapor pressure of water. Accordingly, the booster pump 148 facilitates in increasing a pressure differential between the vapor channels 116 and the air channels 114 to increase the water extraction rate from the air flowing through the air channels 114. In embodiments, the booster pump 148 and the water ejector 150' together reduce the pressure at the inlet of the booster pump 110 to a value between 20 mbarA to 40 mbarA. In embodiments, the pressure reducer system 146' may create a pressure of less than 20 mbarA at the inlet of the booster pump 148. In embodiments, the pressure reducer system 146' may create a pressure of less than 10 mbarA at the inlet of the booster pump 148. In embodiments, the pressure reducer system 146' may create a pressure between 10 mbarA and 20 mbarA at the inlet of the booster pump 148. The booster pump 148 and the water ejector 150' may be controlled to reduce the pressure inside the vapor channels 116 depending upon a size of the dehumidification system 102' and a desired water extraction rate.

In embodiments, the booster pump 148 is a root pump. However, it may be appreciated that any type of vacuum booster pump known in the art may be utilized. Additionally, the water ejector 150' is similar to the water ejector 150 except that a vapor inlet port 168' that is in fluid communication with the booster pump 148 is arranged proximate to an inlet port 160 of an inlet portion 158 of the water ejector 150' rather than a throat portion 162 of the water ejector 150'.

Figure 7:
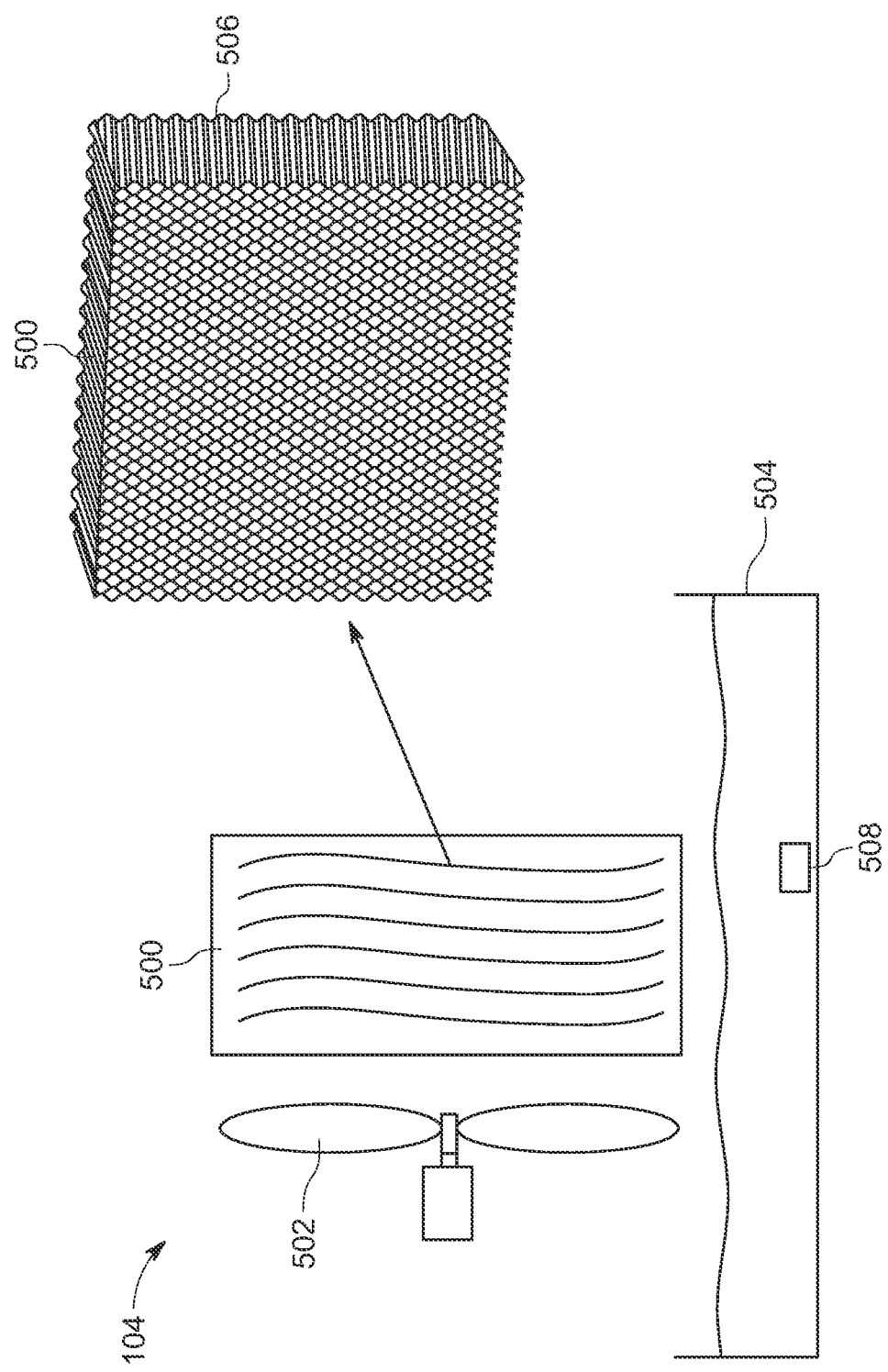
FIG. 7 is an enlarged schematic view of an embodiment of a first evaporative cooler.

Again referring to FIG. 1, the first evaporative cooler 104 is disposed upstream of the dehumidifier core 110 and is arranged to receive the first air stream 200A from the room 300, while the second evaporative cooler 106 is disposed downstream of the dehumidifier core 110. As shown in FIG. 1 and FIG. 7, the first evaporative cooler 104 includes an evaporative pad 500 (herein after referred to as a first evaporative pad 500), a fan 502 (hereinafter referred to as first fan 502) disposed upstream of the first evaporative pad 502 to draw the first airstream 200A from the room 300 towards the first evaporative pad 502. The first evaporative cooler 104 may further include a pan 504 (hereinafter referred to as a first pan 504) to collect any excess water drained from the first evaporative pad 500. The first evaporative pad 500 facilitates an evaporation of liquid water into the first airstream 200A passing through the first evaporative pad 200A, and thereby facilitates in cooling of the first airstream 200A. As such, the liquid water absorbs the latent heat from the first airstream 200A and gets converted into water vapors as the air (i.e., the first air stream 200A) passes through the first evaporative pad 500. Accordingly, the air gets cooled as the air passes through the first evaporative pad 500, while a moisture content of the air increases. In this manner, the first evaporative cooler 104 receives the first airstream 200A from the room 300 and expels the air having relatively high humidity and lower temperature as the inlet air 400A.

In embodiments, the first evaporative pad 500 may include a honeycomb structure 506 (shown in FIG. 7) to provide a relatively large surface area to facilitate an evaporation of the liquid water into the air. Although the honeycomb structure 506 is contemplated, it may be appreciated that the first evaporative pad 500 may include any other structure suitable for facilitating the evaporation of the liquid water. Further, the first evaporative cooler 104 may include one or more nozzles (not shown) to inject liquid water into the first evaporative pad 500 and a pump 508 (shown in FIG. 7) to provide the liquid water from the first pan 504 to the one or more nozzles (not shown) to keep the first evaporative pad 500 wet. Moreover, the first fan 502 helps in pulling the first airstream 200A from the room 300 towards the first evaporative pad 500 may also be disposed downstream of the first evaporative pad 500. In such a case, the first fan 502 may be disposed upstream of the dehumidifier core 110. Although the air-cooling system 100 having a single evaporative cooler 500 disposed upstream of the dehumidifier core 110 is shown and contemplated, it may be envisioned that the air-cooling system 100 may include any number of evaporative coolers disposed in series and upstream of the dehumidifier core 110.

Figure 8:
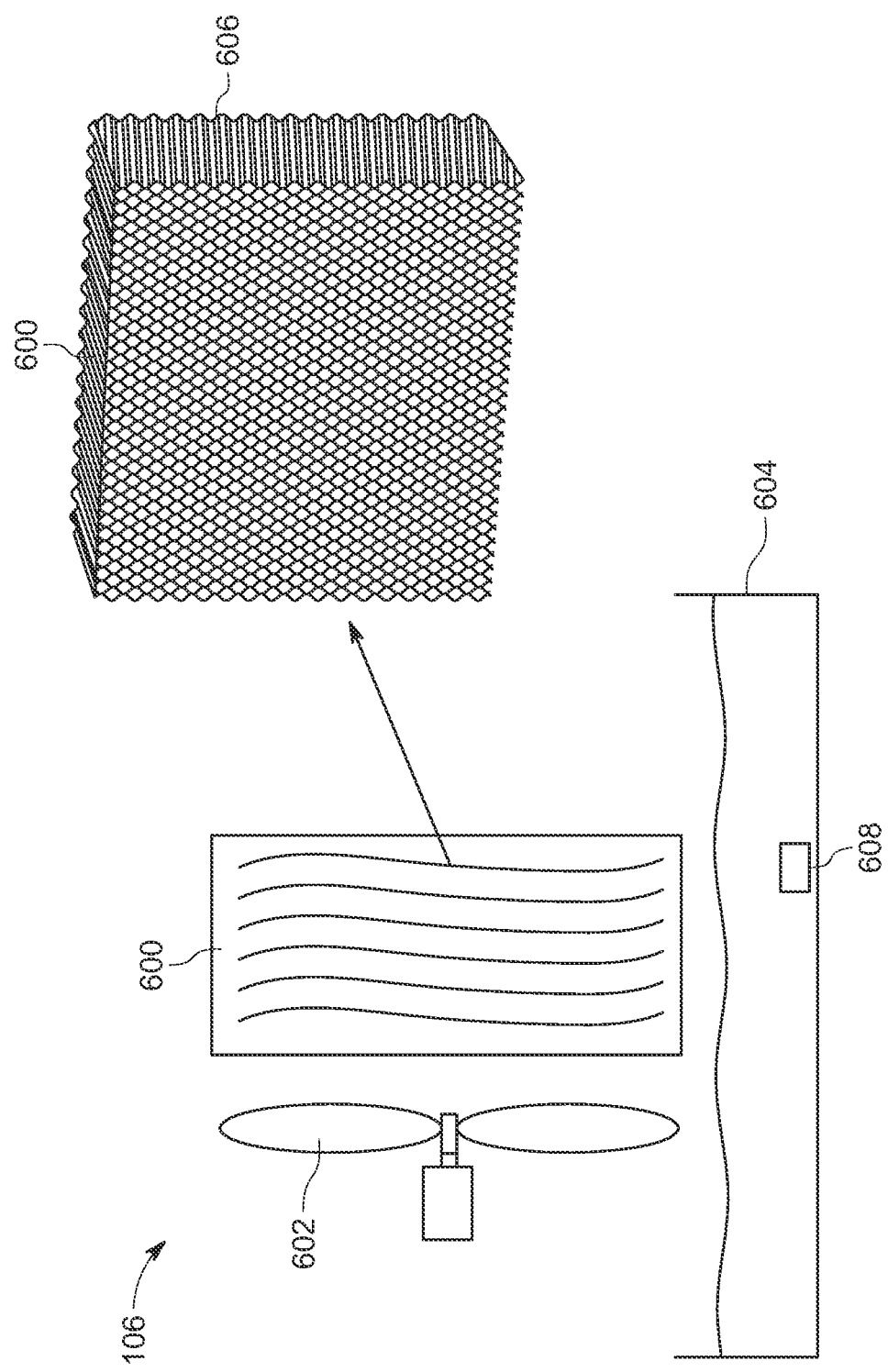
FIG. 8 is an enlarged schematic view of an embodiment of a second evaporative cooler.

As shown in FIG. 1, the second evaporative cooler 106 is arranged to receive an air (i.e., the outlet air 400B) discharged by the dehumidification core 110 and provides a relatively cooler air (i.e., the second airstream 200B) to the room 300. As shown in FIG. 1 and FIG. 8, the second evaporative cooler 106 may include an evaporative pad 600 (hereinafter referred to as second evaporative pad 600), a fan 602 (hereinafter referred to as second fan 602) disposed upstream of the second evaporative pad 600 to direct and supply the cooled air (i.e. the second airstream 200B) the to the room 300, and a pan 604 (herein after referred to as second pan 604) to collect excess water drained from the second evaporative pad 600. The second evaporative pad 600 facilitates an evaporation of liquid water into the air (i.e., the outlet air 400B), and thereby facilitates in cooling of the air passing through the second evaporative pad 600. As such, the liquid water absorbs the latent heat from the air and gets converted into water vapors as the air passes through the second evaporative pad 600. Accordingly, the air gets cooled as the air passes through the second evaporative pad 600, while a moisture content of the air also increases. In this manner, the second evaporative cooler 106 receives the outlet air 400B discharged by the dehumidifier core 110 and expels and direct the air having relatively high humidity and lower temperature as the second airstream 200B to the room 300.

In embodiments, the second evaporative pad 600 may include a honeycomb structure 606 (shown in FIG. 8) to provide a relatively large surface area to facilitate an evaporation of the liquid water into the air. Although the honeycomb structure 606 is contemplated, it may be appreciated that the second evaporative pad 600 may include any other structure suitable for facilitating the evaporation of the liquid water. Further, the second evaporative cooler 106 may include one or more nozzles (not shown) to provide the liquid water into the second evaporative pad 500 and a pump 608 (shown in FIG. 8) to provide the liquid water from the second pan 604 to the one or more nozzles (not shown) to keep the second evaporative pad 500 wet. Although the air-cooling system 100 having a single evaporative cooler 600 disposed downstream of the dehumidifier core 110 is shown and contemplated, it may be envisioned that the air-cooling system 100 may include any number of evaporative coolers disposed in series and downstream of the dehumidifier core 110. Although two evaporative coolers 104, 106 are contemplated, it may be appreciated that any one of the first evaporative cooler 104 and the second evaporative cooler 106 may be omitted.

Furthermore, in some embodiments, the air-cooling system 100 may include a controller and a plurality of sensors for controlling an operation of the air-cooling system 100. In embodiments, the air-cooling system 100 may include one or more temperature sensors and one or more humidity sensors to monitor a temperature and a humidity of at least one of the first airstream 200A, the inlet air 400A, the outlet air 400B, and the second air stream 200B. Accordingly, the controller may control the pump 152 to deliver the liquid water at an optimum speed so as to maintain or create desired level of vacuum or pressure inside the vapor channels 116. Similarly, the controller may control an amount of water injection into the first evaporative pad 500 and/or the second evaporative pad 600 based on one or more inputs received from the sensors.

In embodiments, as shown in FIG. 1, the air-cooling system 100 may be a spilt type air-cooling system having first unit 700 installed inside the room 300 and a second unit 702, as an outdoor unit, disposed outside the room 300. As shown, the first unit 700 includes a housing 704 (hereinafter referred to as first housing 704) defining an inlet opening 706 for facilitating an entry of relatively hot and humid air (i.e., the first airstream 200A) inside the first housing 704 from the room 300, and an outlet opening 708 to facilitate an exit of relatively cold and dry air (i.e., the second airstream 200B) to the room 300 from the first housing 704. As shown in FIG. 1, the first unit 700 may include the first evaporative cooler 104, the dehumidifier core 110, and the second evaporative cooler 106 mounted inside the first housing 704. The first evaporative cooler 104 may be mounted inside the first housing 704 and disposed proximate to the inlet opening 706, while the second evaporative cooler 106 may be mounted proximate to the outlet opening 708. Moreover, the dehumidification core 110 is mounted to the first housing 704 and is between the first evaporative cooler 106 and the second evaporative cooler 106.

Further, the second unit 702 may include a second housing 710 and the water ejector 150, the pump 152, the reservoir 154, and the heat exchanger 182. The water ejector 150, the pump 152, the reservoir 154, and the heat exchanger 182 are disposed inside the second housing 710 and mounted to the second housing 710. Further, the conduit 140 extends outside the first housing 700 and connected to the vapor inlet port 168 of the water ejector 150. Although the air-cooling system 100 is contemplated as the split air-cooling system, it may be appreciated that air-cooling system 100 may be contemplated as single window type air-cooling system. In such a case, the second housing 710 may be omitted, and the water ejector 150, the pump 152, the reservoir 154, and the heat exchanger 182 may be mounted inside the first housing 700.

Although, the air-cooling system 100 having a single dehumidification system 102 is shown and contemplated, it may be appreciated that the air-cooling system 100 may include any number of dehumidification system 102 arranged in series configuration, or a parallel configuration, or a combination thereof. Further, the dehumidification system 102 having a single dehumidification core 110 is shown and contemplated, it is possible that the dehumidification system may include multiple dehumidification cores 110 arranged in series configuration, or a parallel configuration, or a combination thereof.

Figure 9:
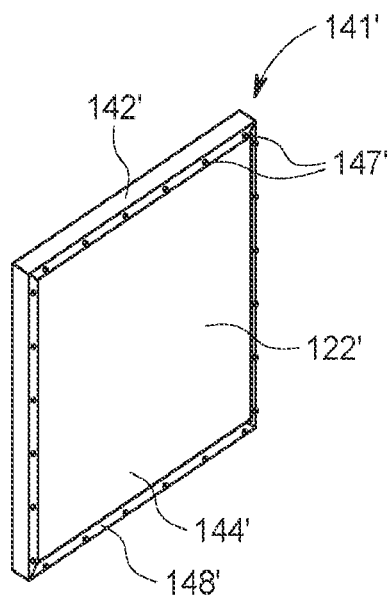
FIG. 9 illustrates an assembled view of an embodiment of a stack of a dehumidification core.
Figure 10:
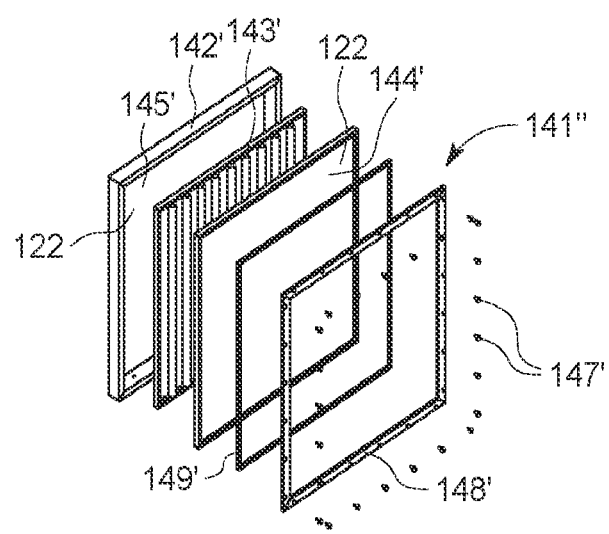
FIG. 10 illustrates an exploded view of the stack of FIG. 9.

Referring to FIG. 9 and FIG. 10, a stack 141', according to an alternative embodiment of the disclosure is shown, the stack 141' includes an outer frame 142' and a corrugated structure 143' arranged inside the outer frame. 142' and supported by the outer frame 142'. The corrugated structure 143' defines the plurality of vapor channel 116 having substantially triangular shape. Further, the stack 141' includes two layers of the membrane 122, for a first layer 144' of the membrane 122 arranged on a first side to the corrugated structure 143' and a second layer 145' of the membrane 122 arranged on a second side, opposite to the first side, of the corrugated structure 143'. As shown, the first layer 144', the second layer 145', and the corrugated structure 143' are arranged such that the corrugated structure 143' is sandwiched between the first layer 144' and the second layer 145'. Also, the first layer 144' and the second layer 145', respectively, abuts the first side of the corrugated structure 143' and the second side of the corrugated structure 143'. Accordingly, the air channels 114 are separated from the adjacent vapor channels 116 by the membrane 122. In embodiments, the outer frame 142' and the corrugated structure 143', each is made of aluminum. In such a case, the outer frame 142', the corrugated structure 143', the layers 144', 145' are fastened together by using a plurality of bolts 147' and one or more cover strips 148'. In embodiments, one or more gaskets 149' may be arranged between the cover strip 148' and the outer frame 142' to prevent a leakage of vacuum. Further, each vapor channel 116 includes an outlet to facilitate a fluid communication of the vapor channels 116 with the conduit 140 (shown in FIG. 4). The stack 141' may include suitable structures, such as a cavity formed in the outer frame 142', to receive the conduit 140 and other suitable structures to facilitate the fluid communication between the vapor channels 116 and the conduit 140. The plurality of stacks 141' may be assembled similar to the assembly of the stacks 141 to form a dehumidification core.

Figure 11:
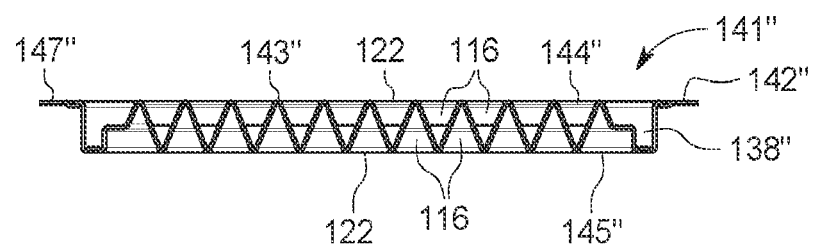
FIG. 11 illustrates a sectional view of an embodiment of a stack of a dehumidification core.
Figure 12:
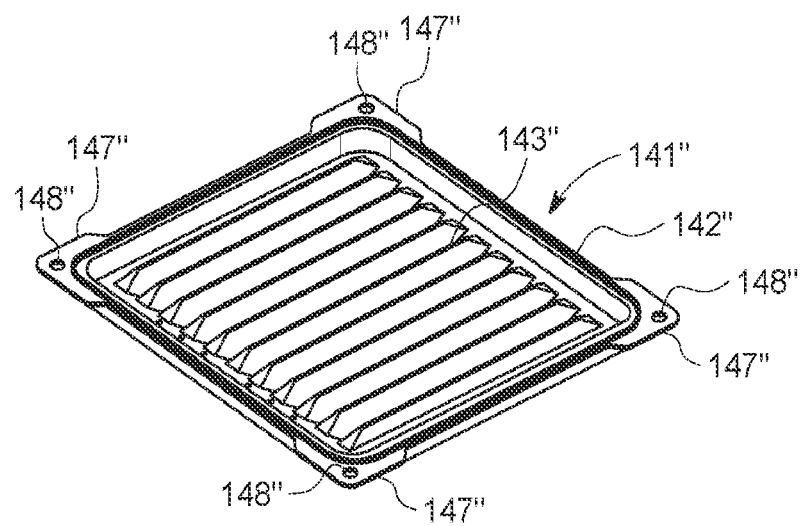
FIG. 12 illustrates top view of the stack of FIG. 11 depicting an outer frame integrally formed with a corrugated structure.

Referring to FIG. 11 and FIG. 12, a stack 141", according to yet another embodiment is shown. In this embodiment, the stack 141" includes an outer frame 142" and a corrugated structure 143" integrally formed with the outer frame 142" and may be made of plastic. In such a case, the outer frame 142" and the corrugated structure 143" are formed using thermoforming. Although thermoforming is contemplated, it may be appreciated that the stack may be formed by using other suitable techniques, such as, but not limited to, extrusion, injection molding, stamping, etc. As shown the outer frame 142" includes a plurality of flanges 147" to facilitate at attachment of number of stacks 141" together to form a dehumidification core. The number of stacks 141" are arranged substantially parallel to and spaced apart from each in an arrangement similar to the arrangement of the stacks 141. The stacks 141" are engaged with each other by inserting fasteners (not shown) though the holes 148" defined by the flanges 147". Further, the stacks may be assembled/connected to each other using a plurality of fasteners. Moreover, one or more spacers may be inserted between two adjacent stacks to form air channel between the two adjacent stacks.

Further, the stack 141" includes two layers of the membrane 122, for a first layer 144" of the membrane 122 arranged on a first side to the corrugated structure 143" and a second layer 145" of the membrane 122 arranged on a second side, opposite to the first side, of the corrugated structure 143". As shown, the first layer 144", the second layer 145", and the corrugated structure 143" are arranged such that the corrugated structure 143" is sandwiched between the first layer 144" and the second layer 145". Also, the first layer 144" and the second layer 145", respectively, abuts the first side of the corrugated structure 143" and the second side of the corrugated structure 143". In embodiments, the first layer 144" and the second layer 145" may be integrally formed with the outer frame 142" during thermoforming. Moreover, each vapor channel 116 includes an outlet to facilitate a fluid communication of the vapor channels 116 with the conduit 140 (shown in FIG. 4). The stack 141" may include suitable structures, such as a cavity, to receive the conduit 140 and other suitable structures to facilitate the fluid communication between the vapor channels 116 and the conduit 140.

Figure 13:
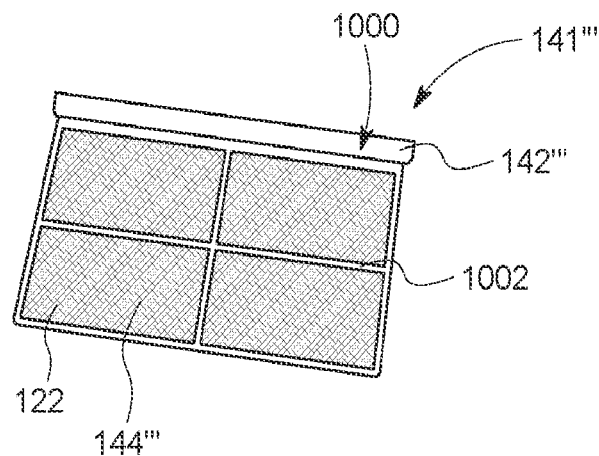
FIG. 13 illustrates an embodiment of a stack of a dehumidification core.
Figure 14:
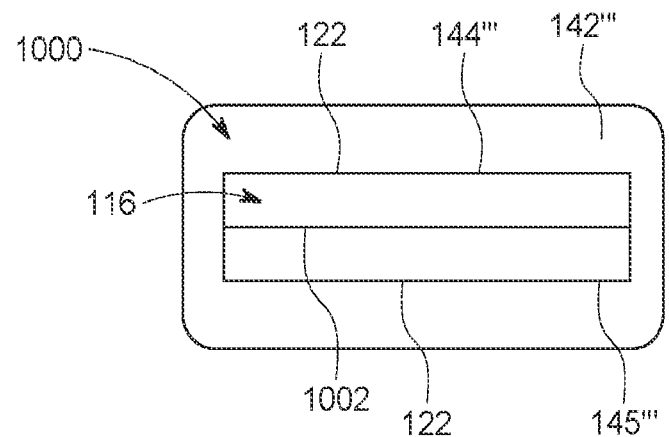
FIG. 14 illustrates a top sectional view of the stack of FIG. 13.
Figure 15:
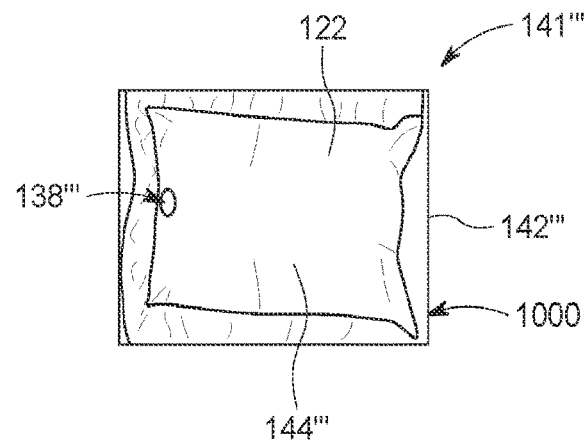
FIG. 15 illustrates a top view of the stack of FIG. 13 depicting an outlet.

Referring to FIGS. 13, 14, and 15, a stack 141''', according to yet another embodiment is shown. The stack 141''' includes a frame structure 1000 having a mesh 1002 and an outer frame 142''' connected to the sides of the mesh 1000 for supporting the mesh 1002. Further, the stack 141''' includes a first layer 144''' of the membrane 122 attached to the outer frame 142''' and arranged parallel to the mesh 1002 and spaced apart from the mesh 1002, and a second layer 145''' of the membrane 122 attached to the outer frame 142''' and arranged spaced apart and parallel to the mesh 1002. Also, an outer edge of the first layer 144''' and an outer edge of the second layer 145''' are fused with the outer frame 142''' to provide a leak proof joint.

Moreover, the first layer 144''' and the second membrane 145''' are disposed on the opposite sides of the mesh 1002 such that the mesh 1002 is arranged between the two layers 144''', 145'''. Accordingly, a gap between the two layers 144''', 145''' of the stack 141''' define the vapor channel 116 therebetween. Also, the mesh 1002 arranged between the layers 144''', 145''' prevents a collapsing of the layers 144''', 145''' when vacuum or low pressure is created within the vapor channel 116. In embodiments, an outer edge of the first layer 144''' and an outer edge of second layer 145''' are press fused to the outer frame 142''' to provide a leak proof joint. In embodiments, the outer frame 142''' is made of a thermoplastic material, a rubber, or any other suitable material to enable a fusing of the outer edges of the first layer 144''' and the second layer 145''' with the outer frame 142''' and an outer edge of the mesh 1002. Further, the membrane 122 (the first layer or the second layer) defines an outlet 138''' to facilitate a fluid communication with the conduit 140 and the vapor channel 116. The stack 141''' may include suitable structures, such as a cavity formed in the outer frame 142''', to receive the conduit 140 and other suitable structures to facilitate the fluid communication between the vapor channels 116 and the conduit 140 via the outlet 138'''. The plurality of stacks 141''' may be assembled similar to the assembly of the stacks 141 to form a dehumidification core.

Figure 16:
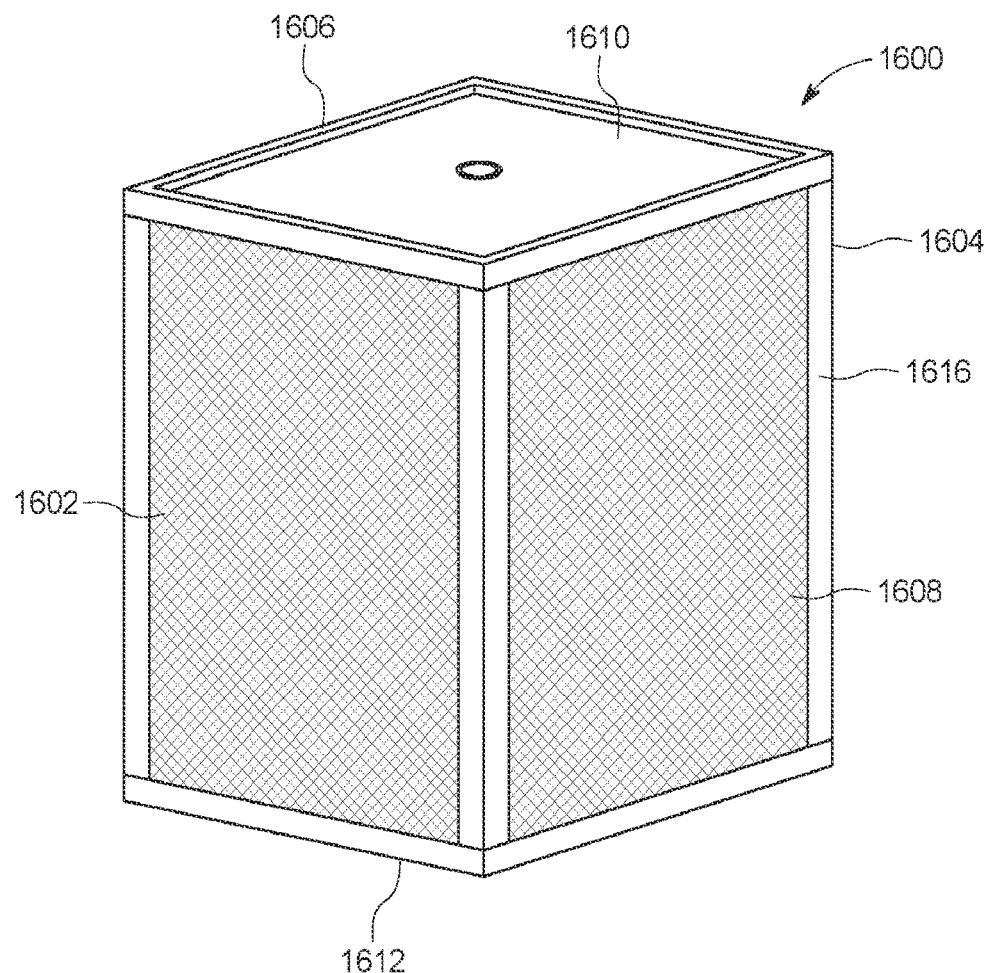
FIG. 16 illustrates a perspective view of an embodiment of a dehumidification core.
Figure 17:
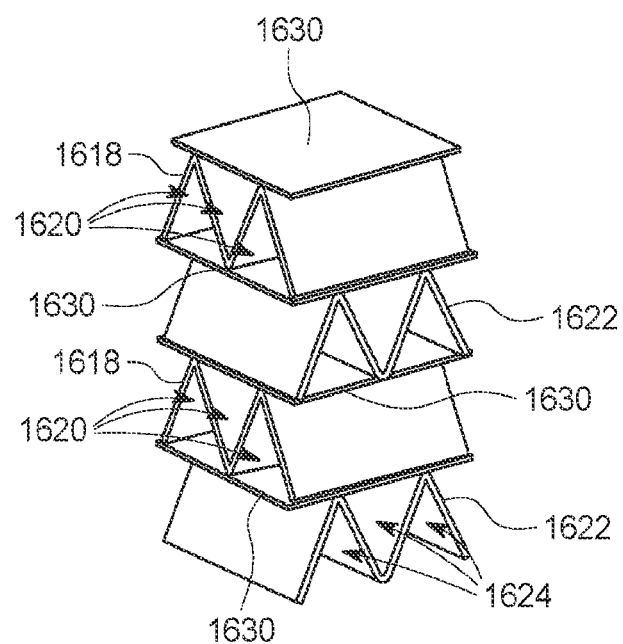
FIG. 17 illustrates a section view of the dehumidification core of FIG. 16 depicting a plurality of first corrugated structures defining a plurality of air channels, and a plurality of second corrugated structures defining a plurality of vapor channels separated from the air channels by a membrane.
Figure 18:
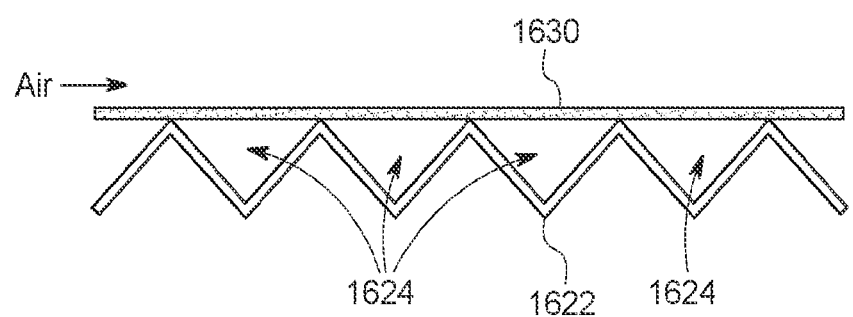
FIG. 18 illustrates a side view of FIG. 17 depicting vapor channels separated from the air channel via the membrane.

Referring to FIGS. 16, 17, and 18, a dehumidification core 1600, according to an alternative embodiment is shown. A shown, the dehumidification core 1600 includes a cuboidal structure having a first side face 1602, a second side face 1604, a third side face 1606, a fourth side face 1608, a top face 1610, and a bottom face 1612. The dehumidification core 1600 includes an outer frame 1616, a plurality of first corrugated structures 1618 defining a plurality of air channels 1620, and a plurality of second corrugated structures 1622 defining a plurality of vapor channels 1624. The first corrugated structures 1618 and the second corrugated structures 1622 are supported by the outer frame 1616, and are disposed within a space defined by the outer frame 1620. As shown, the outer frame 1616 is disposed along the corners of the cuboidal structure and covers the top face 1610 and the bottom face 1612.

Further, the air channels 1620 extend from the first side face 1602 to the second side face 1604, while the vapor channels 1624 extend from the third side face 1606 to the fourth side face 1608. Accordingly, the air channels 1618 and the vapor channels 1624 extend in a mutually perpendicular direction. It may be appreciated that the air may enter the air channels 1618 through the first side face 1602 and leaves the dehumidification core 1600 through the second side face 1604. Also, the vapor channels 1624 are closed at the third side face 1606 and are open on the fourth side face 1608. Therefore, the moisture (i.e., water vapors) extracted from the air leaves the dehumidification core 1600 through the fourth side face 1608. As shown in FIG. 17, the first corrugated structures 1618 and the second corrugated structures 1622 are arranged inside the dehumidification core 1600 such that each first corrugated structure 1618 is arranged adjacent/neighboring the second corrugated structure 1622. In this manner, a single second corrugated structure 1622 is arranged between two adjacent first corrugated structures 1618. Further, each first corrugated structure 1618 is separated from the adjacent second corrugated structures 1622 by a membrane 1630 such that the membrane 1630 abuts both the first corrugated structure 1618 and the second corrugated structure 1622. Accordingly, each air channel 1620 is disposed adjacent to one or more of the vapor channels 1624 and is separated from the adjacent vapor channels 1624 by the membrane 1630 (as shown in FIGS. 17 and 18). The membrane 1630 is identical to the membrane 122 in compositions and function and facilitates a flow of moisture (i.e., water vapors) from the air flowing through the air channels 1620 to the vapor channels 1624 when a low pressure is created/maintained inside the vapor channels 1624. Further, a conduit (not shown) similar to the conduit 140 may extend from the dehumidification core 1600 to a water ejector to facilitate a fluid communication between the vapor channels 1624 and the water ejector.

Figure 19:
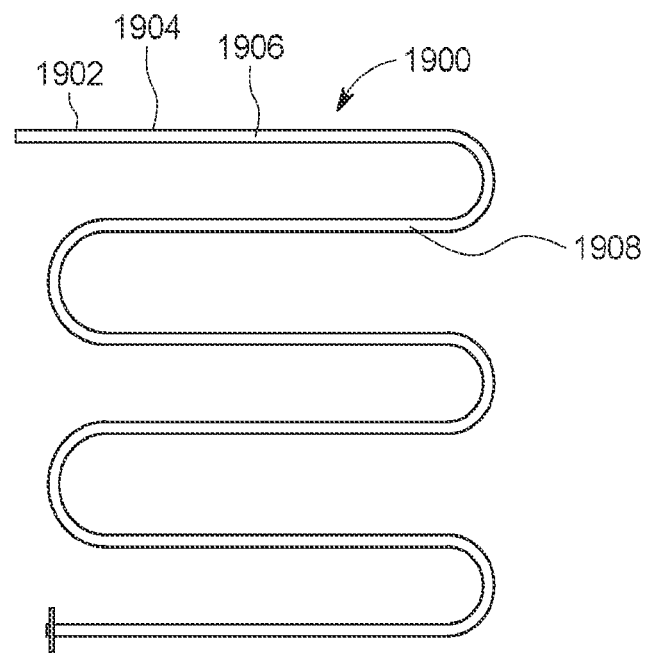
FIG. 19 illustrates a side view of a dehumidification core formed using a conduit made of membrane.
Figure 20:
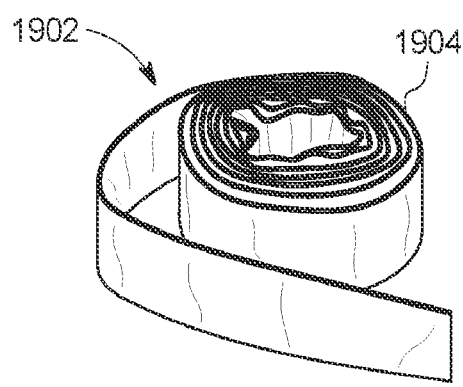
FIG. 20 illustrates a perspective view of the conduit of FIG. 19 in a coiled configuration.

Referring to FIGS. 19 and 20, a dehumidification core 1900, according to an alternative embodiment is shown. The dehumidification core 1900 is formed by using a conduit 1902 having a wall made of a membrane 1904. The conduit 1902 may be arranged in a heat exchanger manner to facilitate a flow of air over the conduit 1902. Further, a channel 1906 of the conduit 1902 defines a vapor channel 1908 of the dehumidification core 1900. It may be appreciated that one end of the conduit 1902 is closed, while a vacuum or low pressure is created inside the conduit 1902 through an opening defined at another end to facilitate a flow of moisture from the air to the vapor channel 1908 through the membrane 1904.

A working of the air-cooling system 100 having the dehumidification core 110 is now explained. It may be envisioned that an air-cooling system having the dehumidification core 1600, 1900 may also function similarly. The air-cooling system 100 receives the first airstream 200A having relatively higher humidity level and higher temperature from the room 300 and supplies the second airstream 200B having relatively less humidity level and less temperature to the room 300. For so doing, the air-cooling system 100 receives the first airstream 200A from the room 300 via the inlet opening 706. In embodiments, the first fan 504 may facilitate a suction/intake of the first airstream 200A into the first unit 700 via the inlet opening 706. Upon entering the first unit 700, the first airstream 200A passes through the first evaporation pad 500 (i.e., the first evaporative cooler 104), and in so doing, the first airstream 200A may cause evaporation of the liquid water disposed inside the first evaporative pad 500, causing a conversion of liquid water into water vapors. Accordingly, a temperature of the first airstream 200A decreases upon passing through the first evaporative pad 500 (i.e., the first evaporative cooler 104) as a latent heat needed to convert the liquid water into water vapors is provided by the first airstream 200A, while a humidity level of the first airstream 200A increases upon passing through the first evaporative pad 500. Therefore, the first evaporative cooler 104 receives the first airstream 200A having relatively high temperature and low humidity and expels the inlet air 400A having relatively lower temperature and higher humidity.

Subsequently, the inlet air 400A enters the dehumidification core 110, flows through the air channels 114, and exits the dehumidification core 110 as the outlet air 400B. During the flow of the inlet air 400A through the air channels 114, at least a portion of the water vapors 120 present into the inlet air 400A flows through the membrane 122 and inside the adjacent vapor channels 116. For facilitating the extraction of the water vapors 120 from the inlet air 400A, and the movement of the water vapors 120 inside the vapor channels 116, a pressure differential is created. The pressure differential is created by creating or maintaining a relatively lower pressure inside the vapor channels 116 as compared to the pressure inside the air channels 114. In fact, to ensure a flow of the water vapors 120 across the membrane 122, the partial pressure of water vapors inside the vapor channels 116 is maintained at a lower value relative to the partial pressure of water vapors inside the air channels 114. For so doing, the controller may control and operates the pump 152 so as to pump the liquid water from the reservoir 154 to the inlet port 160 of the water ejector 150 at an appropriate speed (i.e., a predetermined quantity of the liquid water enters the inlet portion 158 per second). The appropriate speed of the liquid water entering the water ejector 150 may be determined based on the humidity level of the room 300 and/or the humidity level of the inlet air 400A and/or a speed and amount of first airstream 200A entering the air-cooling system 100.

As the liquid water flows though the inlet portion 158 and enters the throat portion 162, the speed of the liquid water increases, and reaches a maximum value at the throat portion 162. Consequently, a relatively low pressure (i.e., vacuum) is created at the throat portion 162, and hence a relatively low pressure is created inside the vapor channels 116 as the vapor channels 162 are in fluid communication with the throat portion 162 via the vapor inlet port 168 and the conduit 140. It may be appreciated that a value of pressure inside the vapor channels 116 may be relatively higher as compared to a value of pressure inside the throat portion 162 due to loss of vacuum caused by the length of conduit 140 and any other bends in the conduit 140. Further, the pressure in the throat portion 162 is created and maintained such that the pressure inside the vapor channels 116 is lower and at a desired pressure differential than the pressure inside the air channels 114. Owing to the differential pressure between the vapor channels 116 and the air channels 114, the water vapors 120 are extracted from the air flowing through the air channels and moves across the membrane 122 to the vapor channels 16. Similarly, the water vapors 120 extracted from the inlet air 400A may move/flow through the conduit 140 and enters the throat portion 162 via the vapor inlet port 168 due the pressure differential between the vapor channels 116 and the throat portion 162. Upon entering the water ejector 150 (i.e., the throat portion 162), the water vapors 120 may move along the liquid water and enters the outlet portion 164 of the water ejector 150. Due to the increase of the cross-sectional area in the outlet portion 164, the velocity of the liquid water decreases, thereby creating a relative high pressure inside the outlet portion 164 as compared to the pressure inside the throat portion 162. Accordingly, the water vapors 120 received from the vapor channels 116 condense inside the outlet portion 164 before leaving the water ejector 150. Accordingly, a need for a separate condenser for condensing the water vapors 120 into the liquid water is eliminated, thereby increasing an efficiency of the dehumidification system 102, and hence the air-cooling system 100.

Heat may be generated due to the condensation of the water vapors 120 inside the outlet portion 164 of the water ejector 150, resulting into an increase in temperature of the liquid water exiting the outlet port 166 of the water ejector 150. To reduce the temperature of the liquid water before delivering the liquid water to the reservoir 154, at least a portion of the liquid water is directed to the heat exchanger 182 that facilitates the cooling of the received liquid water. Thereafter, the cooled liquid water is supplied to the reservoir 154 for storage and is available for subsequent supply to the water ejector 150 by the pump 152. It may be noted that a volume of the liquid water exiting the water ejector 150 and received by the reservoir 154 may be higher than a volume of the liquid water supplied by the pump 152 to the water ejector 150 due to the condensation of the water vapors 120 received from the dehumidifier core 110. Accordingly, the level of the liquid water inside the reservoir 154 may increase. For preventing an overflow of the reservoir 154 and spilling of the liquid water from the reservoir 154, the drain valve 180 may be opened when the level of the liquid water inside the reservoir 154 is above a first threshold level. Opening of the drain valve 180 may allow a drainage of the liquid water from the reservoir 154. Further, the drain valve 180 may be closed in response to a decrease of the level of the liquid water below a second threshold value. In certain implementations, the drain valve 180 is adapted to automatically opened and closed, respectively, in response to the level of the liquid water reaching above the first threshold value and falling below the second threshold value.

Further, the outlet air 400B expelled from the dehumidifier core 110 is received by the second evaporative cooler 106, gets cooled, and exit the second evaporative cooler 106 as the second air stream 200B. Upon entering the second evaporative cooler 106, the outlet air 400B passes through the second evaporation pad 600, and in so doing, the outlet air 400B may cause the evaporation of liquid water disposed inside the second evaporative pad 600, causing a conversion of liquid water into water vapors. Accordingly, a temperature of the air decreases upon passing through the second evaporative pad 600 as a latent heat needed to convert the liquid water into water vapors is provided by the outlet air 400B, while a humidity level of the air increases upon passing through the second evaporative pad 600. Therefore, the second airstream 200B discharged from the second evaporative cooler 106 is relatively cooler than the outlet air 400B received from the dehumidifier core 110 and has a relatively higher humidity compared to the outlet air 400B. The second airstream 200B after exiting the second evaporative cooler 106, exits the air-cooling system 100 via the outlet opening 708, and enters the room 300. It may be appreciated that air-cooling system 100, in general, and the dehumidifier system 102, in particular, is controller in a manner such that the second airstream 200B has relatively less humidity level (i.e., moisture content) relative to the first air stream 200A. For so doing, the pressure at the throat portion 162, and hence inside the vapor channels 116, is controlled such that total amount of moisture extracted by dehumidifier core 110 is greater than a total amount of moisture absorbed by the first airstream 200A upon passing through the first evaporative cooler 104 and the second evaporative cooler 106. Further, a utilization of the liquid water as motive fluid for creating low pressure inside the throat portion 162, and hence inside the vapor channels 116, facilitates in decreasing energy consumption due to non-compressible nature of the liquid water. Further, a use of the water ejector 150 as a pressure reducing means prevents cavitation related damages relative to a scenario in which a conventional pump is used for creating low pressure or vacuum in the vapor channels 116. Also, use of the water ejector 116 facilitates in decreasing an overall size of the dehumidification system 102. Although the dehumidification system 102 is contemplated and explained in conjunction with the air-cooling system 100, it may be envisioned that the dehumidification system 102 may be utilized as a stand-alone system for removing moisture from an air. Also, an application of the dehumidification system 102 as a water extraction and collection may also be contemplated.

Also, the use of water ejector 150 provides a capability of handling high condensable fraction in the form of water vapor, as well as creating a source of fresh water as it condenses moisture extracted at the dehumidification core 110. Further the water ejector 150 is capable of generating vacuum pressures as low as 5 mbar absolute (expressed as mbarA. Also, the water ejector can be tailored to operate in a range of vacuum pressures such as 100 mbarA, 150 mbarA or even 500 mbarA or greater. Vacuum pressure is regulated by adjusting fluid variables such as pressure and flow rate.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms have the same meaning as commonly understood by one of ordinary skill in the art. The singular forms "a," "an," and "the," include plural references unless expressly and unequivocally limited to one referent.

What is claimed is:

1. A dehumidification system for removing water vapors from an air, the dehumidification system comprising:
   at least one dehumidification core defining an air channel and at least one vapor channel separated from the air channel and including
      a membrane separating the at least one vapor channel from the air channel and adapted to facilitate a removal of moisture from the air flowing through the air channel, wherein
         the membrane is selectively permeable to water and water vapor and impermeable to air,
         wherein the membrane includes an ion exchange capacity of at least 1.0 milliequivalents per gram;
   a liquid ejector having:
      a throat portion fluidly coupled to the at least one vapor channel and adapted to create a relatively lower pressure of water vapor within the at least one vapor channel than in the air channel, and
      an outlet portion disposed downstream of the throat portion and configured to increase the pressure inside the liquid ejector to facilitate a condensation of the water vapors received from the at least one vapor channel;
   a reservoir for storing a liquid and configured to receive the liquid from the liquid ejector; and
   a pump fluidly connected to the liquid ejector and the reservoir and configured to supply the liquid from the reservoir to the liquid ejector.

2. The dehumidification system of claim 1, wherein the reservoir includes a drain valve for facilitating a drainage the liquid from the reservoir when a level of the liquid inside the reservoir reaches above a first threshold level.

3. The dehumidification system of claim 1, further including a heat exchanger fluidly connected to the liquid ejector and configured to receive at least a portion of the liquid exiting the liquid ejector, wherein the heat exchanger is configured to cool the received liquid.

4. The dehumidification system of claim 3, wherein the heat exchanger is disposed upstream of the reservoir and supply the cooled liquid to the reservoir.

5. The dehumidification system of claim 1, wherein the relatively lower pressure of water vapor is up to −960 mbar gage pressure.

6. The dehumidification system of claim 1, wherein the liquid ejector is a water ejector adapted to receive liquid water from the pump.

7. The dehumidification system of claim 1, wherein the membrane comprises a sulfonated block copolymer having one or more copolymer block configurations corresponding to any of A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to 30, X is a coupling agent residue, and wherein the sulfonated polymer has a degree of sulfonation of >25.

8. The dehumidification system of claim 1, further including a booster pump arranged between the dehumidification core and the liquid ejector to reduce the pressure inside the vapor channels to a pressure below a partial vapor pressure of water.

9. The dehumidification system of claim 8, the booster pump facilitates in reducing the pressure to a value less than equal to 31.7 mbarA at 25° C.

10. The dehumidification system of claim 9, wherein the booster pump facilitates in reducing the pressure to <150 mbarA, or to 10 mbarA-40 mbarA.

11. An air-cooling system, comprising the dehumidification system of claim 1, and an evaporative cooler for cooling the air by facilitating an absorption of water into the air, wherein the evaporative cooler is disposed downstream or upstream of the at least one dehumidification core.

12. An air-cooling system, comprising:
   at least one dehumidification core defining an air channel and at least one vapor channel separated from the air channel and including
      a membrane separating the at least one vapor channel from the air channel and adapted to facilitate a removal of moisture from the air flowing through the air channel,
         wherein the membrane is selectively permeable to water and water vapor and impermeable to air,
         wherein the membrane includes an ion exchange capacity of at least 1.0 milliequivalents per gram;
   a water ejector having
      a throat portion fluidly coupled to the at least one vapor channel and adapted to create a relatively lower pressure within the at least one vapor channel than in the air channel, and
      an outlet portion disposed downstream of the throat portion and configured to increase the pressure of water to facilitate a condensation of the water vapors received from the at least one vapor channel;
   a reservoir for storing water and configured to receive the water from the water ejector;
   a pump fluidly connected to the water ejector and the reservoir and configured to supply the water from the reservoir to the water ejector; and
   an evaporative cooler for cooling the air by facilitating an absorption of water into the air, the evaporative cooler is disposed downstream or upstream of the at least one dehumidification core.

13. The air-cooling system of claim 12, wherein the reservoir includes a drain valve for facilitating a drainage of the liquid water from the reservoir when a level of the liquid water reaches above a first threshold level.

14. The air-cooling system of claim 12, further including a heat exchanger fluidly connected to the water ejector and configured to receive at least a portion of the liquid water exiting the water ejector, wherein the heat exchanger is configured to cool the received liquid water.

15. The air-cooling system of claim 12, wherein the heat exchanger is disposed upstream of a reservoir and supply the cooled liquid water to the reservoir, and wherein the heat exchanger is an air to liquid heat exchanger.

16. The air-cooling system of claim 12, further including a booster pump arranged between the dehumidification core and the water ejector to reduce the pressure inside the vapor channels to a pressure below a partial vapor pressure of water.

17. The air-cooling system of claim 16, wherein the booster pump facilitates in reducing the pressure to a value <=31.7 mbarA, or <150 mbarA, or between 20 mbarA and 40 mbarA at 25° C.

18. The air-cooling system of claim 12, wherein the evaporative cooler is a first evaporative cooler disposed upstream of the dehumidification core and adapted to cool the air flowing to the dehumidification core, the air-cooling system further includes a second evaporative cooler disposed downstream of the dehumidification core and configured to cool the air received from the dehumidification core.

\* \* \* \* \*